US006584439B1

(12) United States Patent
Geilhufe et al.

(10) Patent No.: US 6,584,439 B1
(45) Date of Patent: Jun. 24, 2003

(54) METHOD AND APPARATUS FOR CONTROLLING VOICE CONTROLLED DEVICES

(75) Inventors: Michael Geilhufe, Palo Alto, CA (US); David MacMillan, Woodside, CA (US); Avraham Barel, Doar na shimshon (IL); Amos Brown, Givat smmuhel (IL); Karin Lissette Bootsma, San Jose, CA (US); Lawrence Kent Gaddy, San Jose, CA (US); Phillip Paul Pyo, San Jose, CA (US)

(73) Assignee: Winbond Electronics Corporation, Hsinchu (TW)

( * ) Notice: Subject to any disclaimer, the term of this patent is extended or adjusted under 35 U.S.C. 154(b) by 0 days.

(21) Appl. No.: 09/316,643

(22) Filed: May 21, 1999

(51) Int. Cl.[7] ............................................... G10L 15/22
(52) U.S. Cl. ....................................... 704/270; 704/275
(58) Field of Search ................................. 704/246, 270, 704/272, 273, 275; 379/88.01, 88.02, 88.03, 88.04

(56) References Cited

U.S. PATENT DOCUMENTS

| | | | |
|---|---|---|---|
| 4,520,576 A | | 6/1985 | Vander Molen |
| 4,556,944 A | | 12/1985 | Daniels et al. |
| 4,644,107 A | | 2/1987 | Clowes et al. |
| 4,731,811 A | | 3/1988 | Dubus |
| 4,737,976 A | | 4/1988 | Borth et al. |
| 4,797,924 A | * | 1/1989 | Schnars et al. ............ 704/275 |
| 4,853,953 A | | 8/1989 | Fujisaki |
| 4,857,030 A | | 8/1989 | Rose |
| 4,882,685 A | | 11/1989 | van der Lely |
| 4,928,302 A | | 5/1990 | Kaneuchi et al. |
| 4,961,212 A | | 10/1990 | Marui et al. |
| 5,007,081 A | | 4/1991 | Schmuckal et al. |
| 5,020,107 A | | 5/1991 | Rohani et al. |

(List continued on next page.)

FOREIGN PATENT DOCUMENTS

| | | |
|---|---|---|
| EP | 0 238 695 A1 | 3/1986 |
| EP | 0 618 710 A1 | 3/1994 |
| EP | 0 618 710 A2 | 3/1994 |
| EP | 0 700 031 A1 | 8/1995 |
| EP | 0 739 121 A2 | 4/1996 |
| EP | 0 730 261 A2 | 9/1996 |
| EP | 0 810 502 A1 | 12/1997 |
| EP | 0 854 417 A2 | 1/1998 |
| EP | 0 867 860 A2 | 3/1998 |
| EP | 0 911 808 A1 | 4/1999 |
| WO | wo 98 09265 A | 3/1998 |
| WO | wo 98 55992 | 12/1998 |
| WO | WO 99/05671 | 2/1999 |
| WO | WO 99/08084 | 2/1999 |
| WO | WO 99/14928 | 3/1999 |

OTHER PUBLICATIONS

Business Wire, Unisys announcing major enhancements to natural Language Assistant, Business Wire, Apr. 15, 1997.
PR Newswire, PureSpeech Demonstrates Virtual Voice Assistant for PC Telephony Using Intel's MMX Technology, PR Newswire, Sep. 17, 1996.
PR Newswire, PureSpeech Raises $4.3 Million in Venture Capital Financing, PR Newswire, May 7, 1996.
Business Wire, Harris & Harris Group Increases Investment in PureSpeech, Business Wire, May 7, 1996.

(List continued on next page.)

Primary Examiner—Marsha D. Banks-Harold
Assistant Examiner—Martin Lerner
(74) Attorney, Agent, or Firm—Blakely, Sokoloff, Taylor & Zafman LLP

(57) ABSTRACT

Voice controlled devices with speech recognition have user assignable appliance names and default appliance names to address and control the voice controlled devices. Methods of controling voice controlled devices include addressing a voice controlled device by name and providing a command.

37 Claims, 21 Drawing Sheets

Microfiche Appendix Included
(1 Microfiche, 72 Pages)

U.S. PATENT DOCUMENTS

| | | | |
|---|---|---|---|
| 5,042,063 A | | 8/1991 | Sakanishi et al. |
| 5,054,082 A | | 10/1991 | Smith et al. |
| 5,117,460 A | | 5/1992 | Berry et al. |
| 5,165,095 A | | 11/1992 | Borcherding |
| 5,222,121 A | | 6/1993 | Shimada |
| 5,369,685 A | | 11/1994 | Kero |
| 5,406,618 A | | 4/1995 | Knuth et al. |
| 5,452,340 A | | 9/1995 | Engelbeck et al. |
| 5,457,769 A | | 10/1995 | Valley |
| 5,566,272 A | | 10/1996 | Brems et al. |
| 5,602,963 A | | 2/1997 | Bissonnette et al. |
| 5,652,789 A | | 7/1997 | Miner et al. |
| 5,685,000 A | * | 11/1997 | Cox, Jr. .......................... 704/9 |
| 5,752,232 A | | 5/1998 | Basore et al. |
| 5,774,841 A | | 6/1998 | Salazar et al. |
| 5,777,571 A | | 7/1998 | Chuang |
| 5,794,204 A | | 8/1998 | Miyazawa et al. |
| 5,799,065 A | | 8/1998 | Junqua et al. |
| 5,805,672 A | | 9/1998 | Barkat et al. |
| 5,842,168 A | | 11/1998 | Miyazawa et al. |
| 5,867,574 A | | 2/1999 | Eryilmaz |
| 5,874,939 A | | 2/1999 | Galvin |
| 5,878,394 A | | 3/1999 | Muhling |
| 5,884,265 A | | 3/1999 | Squitteri et al. |
| 5,895,447 A | | 4/1999 | Ittycheriah et al. |
| 5,895,448 A | | 4/1999 | Vysotsky et al. |
| 5,924,070 A | * | 7/1999 | Ittycheriah et al. ......... 704/275 |
| 6,052,666 A | * | 4/2000 | Diehl et al. .................. 704/275 |
| 6,119,088 A | * | 9/2000 | Ciluffo ....................... 704/275 |
| 6,397,186 B1 | * | 5/2002 | Bush et al. .................. 704/274 |

OTHER PUBLICATIONS

Apple Website, Dragon Systems Brings Speech Recognition Software to the Macintosh, Apple Computer, Inc.

Network Briefing, Datacoms: General Magic Goes Back to Its Roots with New Handheld, Network Briefing, Jun. 23, 1998.

Audiotex Update, Unisys and Parity Create Spoken Language Environment for IVR, Audiotex Update, Apr. 1, 1998.

Network Briefing, Finance: Microsoft Invests in General Magic, Gets Hands on Serengeti, Network Briefing, Mar. 5, 1998.

Work–Group Computing Report, Voice Processing: General Magic and Encanto Netowrks Demonstrate Voice–Based E–Commerce Application, Dec. 15, 1997.

Telemedia News & Views, A Flood of Universal Mailboxes, Telemedia News & Views, Aug. 1, 1998.

Business Wire, General Magic Names James McCormick Chief Operating Officer, Business Wire, Mar. 23, 1999.

Business Wire, General Magic Announces Fourth Quarter and Year–End 1998 Results, Business Wire, Mar. 10, 1999.

PR Newswire, NetSage Showcases Social Intelligence Server for Relationship Management, Pr Newswire, Feb. 11, 1999.

PR Newswire, NetSage Unveils Social Intelligence Server that Personalizes Online and Automated Voice Experiences, Feb. 8, 1999.

Business Wire, Wireless Knowledge and General Magic Plan to Add Voice–Enabling Capabilities to Revolv, Feb. 8, 1999.

Computergram International, General Magic Spins Off Datarover Handheld Division, Computergram International, Oct. 30, 1998.

Business Wire, General Magic Announces MagicTalk, the First Intelligent Voice User Interface Platform, Business Wire, Apr. 9, 1998.

Computergram International, Microsoft Invests in General Magic, Gets Hands on Serengeti, Computergram International, Mar. 5, 1998.

Business Wire, General Magic Announces Serengeti Field Test Completion and Continued Momentum Toward Next Milestone, Business Wire, Sep. 23, 1997.

Network Computing, Enter The Odyssey, Network Computing, Jul. 15, 1997.

Network Computing, Enter the Odyssey: Telescript mobile agent system, Network Computing, Jul. 1, 1997.

PR Newswire, Xybernaut Announces New Wearable Computer at International Conference, PR Newswire, Jun. 2, 1998.

PR Newswire, Voice Diary Ltd. Presents at TechVentures: Santa Clara, PR Newswire, May 28, 1998.

PR Newswire, Sony Digital Products President Finalizes Deal to Manufacture Xybernaut's® Mobile Assistant IV® Wearable Computer, PR Newswire, May 13, 1998.

Business Wire, General Magic Announces Reseller Channel Strategy for New Portico Virtual Assistant, Business Wire, May 5, 1998.

Business Wire, Top Telecommunications Companies to Trial Portico Service for General Magic; Extended Trials Begin in Next 30 Days, Business Wire, May 5, 1998.

Business Wire, General Magic and Encanto Networks Demonstrate Voice–Based E–Commerce Application, Business Wire, Dec. 10, 1997.

Business Wire, General Magic gives first look at future of mobile business communications, Business Wire, Apr. 28, 1997.

Business Wire, Handwriting and Speech Recognition Announced for Memos Open Operating Environment, Business Wire, Sep. 24, 1996.

PR Newswire, J. Robin Rohlicek Joins Purespeech as Vice President of Engineering, PR Newswire, Nov. 28, 1995.

Telephone IP News, General Magic Begins Web Sign–Up for Virtual Assistant Service, Telephone IP News, May, 1999.

Audiotex Update, General Magic Acquires Netalk, Audiotex Update, Jan., 1999.

Audiotex Update, "Portico" Enables Mobile Users to Access Info Via Phone, Audiotex Update, Oct. 1, 1998.

Audiotex Update, ISD Gets Exclusive Rights to Embed Conversa Technology, Audiotex Update, Sep. 1, 1998.

Telephone IP News, General Magic Signs PC Quote to Deliver Stock Market Data, Telephone IP News, Aug. 1, 1998.

Network Briefing, Finance: General Magic Bags Another $35M, Network Briefing, Jun. 26, 1998.

Business Wire, General Magic Announces NeTalk Acquisition; Patent–Pending Technology to Further Advancement of magic Talk Platform, Business Wire, Nov. 24, 1998.

PR Newswire, Xybernaut Corporation (NASDAQ) and JAE Launch New Wearable Flat Panel Display at COMDEX in Las Vegas, PR Newswire, Nov. 19, 1998.

Business Wire, General Magic Announces Exclusive Agreement with Intuit, Business Wire, Nov. 9, 1998.

Business Wire, General Magic's DataRover Division to Become Independent Enterprise; General Magic will Focus Efforts on Expansion of the Portico Service and Development of magicTalk, Business Wire, Oct. 28, 1 998.

PR Newswire, NetSage Merges with FunArts; Nass and Reeves of Stanford University Join with Combined Company to Lead Social Interface Market, PR Newswire, Oct. 20, 1998.

Business Wire, General Magic Launches Major Marketing Campaign for National Debut of Portico Service, Business Wire, Sep. 21, 1998.

Business Wire, Saatchi & Saatchi Performs Magic; Business Wire, Jul. 6, 1998.

Business Wire, General Magic Secures $35 Million in Added Financing, Business Wire, Jun. 25, 1998.

Bernstein, Could this Be Magic?, Telephony, Apr. 6, 1998, vol. 234, No. 14, 1 page.

Barchard, Natural Language Modernizes the Call Center, Telemarketing and Call Center Solutions, vol. 16, No. 3, 9/97, 6 pages.

Stevens, Are You Ready for the Desktop of the Future?, Datamation, vol. 40, No. 11, Jun. 1, 1994, 4 pages.

Meisel, Straight Talk about Speech Recognition [voice user interfaces], Business Communications Review, vol. 26, No. 8, Aug., 1996, 5 pages.

Business Wire, Genenrral Magic Secures Additional Financing; Company Obtains $20 Million to Further Voice–Enabled Services, Predicasts, Mar. 31, 1991.

PR Newswire, The Nation's First Free Voicemail Service Set for April Launch, PR Newswire, Mar. 31, 1991.

Business Wire, Telephone Speech Recognition Technology will Impact E–commerce, Business Wire, Feb. 22, 1999.

Business Wire, General Magic Selects Speech–Activated Technology from SpeechWorks; Business Wire, Jan. 19, 1999.

PR Newswire, Voice Control Systems' Award–Winning Speechware(TM) Successfully Deployed in Key Worldwide Accounts, PR Newswire, Jan. 14, 1999.

Business Wire, General Magic to Demonstrate Portico–Enabled Auto PC at CES; Business Wire, Jan. 7, 1999.

Business Wire, General Magic Announces Web Sign–up for the Portico Virtual Assistant Service, Business Wire, Dec. 28, 1998.

Business Wire, General Magic Awarded New Innovator Award; magicTalk Honored for Excellence in Integrated Voice/Data Technology, Business Wire, Dec. 21, 1998.

Business Wire, InTouch Systems Announces Inflection 3.0; Business Wire, Dec. 21, 1998.

Business Wire, Telephone Speech Recognition May Grow Faster Than the Internet; New Summit Conference draws Technology Leaders, Business Wire, Dec. 19, 1998.

Balentine, et al., Debouncing the Speech Button: A Sliding Capture Window Device for Synchronizing Turn–Taking, International Journal of Speech Technology 2, May 28, 1996, _pp. 7–19 (1997), Kluwer Academic Publishers, The Netherlands.

Balentine, et al., Goal–Orientation and Adaptivity in a Spoken Human Interface, Journal of the American Voice I/O Society, San Jose, California, Feb., 1992.

Balentine, A Multimedia Interface: Speech, Sound, Sight and Touch, AVIOS '94 Proceedings, American Voice Input/Output Society, San Jose, California, Sep., 1994.

Zhu, et al., An Automated NC Programming system in integrated CAD/CAM, ICAS, Congress, 18th, Beijing, China, Sep. 20–25, 1992, Proceedings, vol. 2 (A93–14151 03–01), American Institute of Aeronautics and Astronautics, Inc., Washington.

Rolwing, Phones Heading Backward to Future, Arizona Republic, Feb. 5, 1999, newspaper article, Arizona.

PR Newswire, NetSage Merges with FunArts: Nass and Reeves of Stanford University Join with Combined Company to Lead Social Interface Market, San Francisco, California, Oct. 20, 1998.

Automatic ID News, New Mobile Computing Company offers Pen–Based Terminal, 1/99, Automatic I.D. News, vol. 15, No. 1, United States.

Newsbytes News Network, Telecom Trials of Portico Voice User Interface, Newsbytes, news Network, May 6, 1998, United States.

RCR Radio Communications Report, General magic unveils voice platform, RCR Radio Communications Report, vol. 17, No. 15, Apr. 13, 1998, United States.

Computergram International, General Magic Demonstrates New Voice Agents, Computergram International, Apr. 13, 1999.

Computergram International, General Magic Bags Another $35M, Computergram International, Jun. 26, 1998.

Computergram International, General Magic Goes Back to Its Roots with New Handheld, Computergram International, Jun. 23, 1998.

Military & Aerospace Electronics, Wearable Computers Could Revolutionize Military Maintenance and Inspection, Military & Aerospace Electronics, Nov., 1995, 3 pages.

Gohring, Hello! Welcome to Portico . . . , Telephony, vol. 234, No. 20, May 18, 1995, 1 page.

* cited by examiner

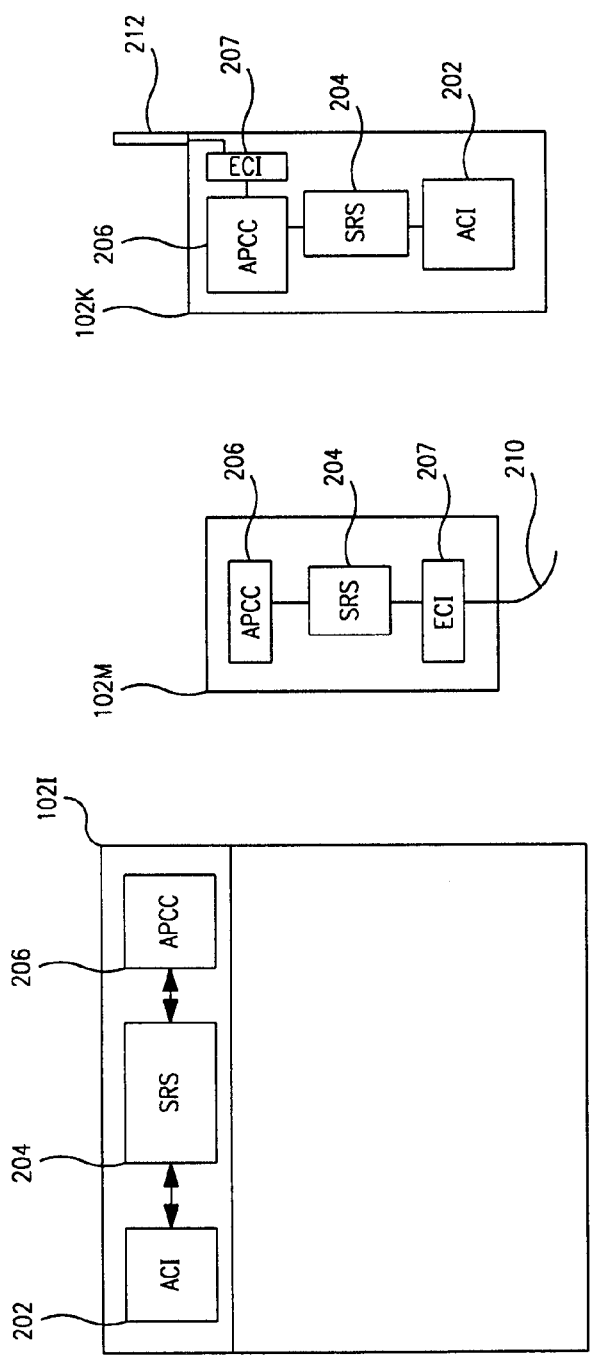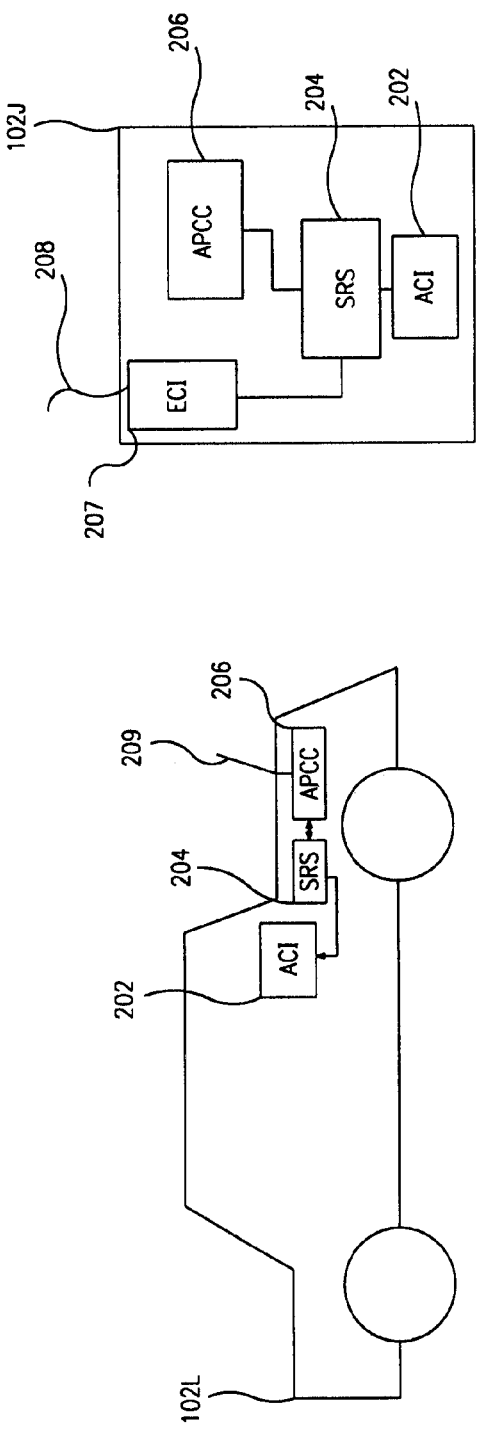
FIG. 2

METHOD AND APPARATUS FOR CONTROLLING VOICE CONTROLLED DEVICES

CROSS REFERENCE TO RELATED APPLICATION

This application is also related to U.S. patent application Ser. No. 09/316,332, filed by inventors GEILHUFE et al, Attorney Docket No. 042236.P052, entitled "METHOD AND APPARATUS FOR STANDARD VOICE USER INTERFACE AND VOICE CONTROLLED DEVICES" and to be assigned to Information Storage Devices, Inc. the disclosure of which is hereby incorporated by reference, verbatim and with the same effect as though it were fully and completely set forth herein.

This application is also related to U.S. patent application Ser. No. 09/316,604, filed by inventors GEILHUFE et al, Attorney Docket No. 042236.P052, entitled "METHOD AND APPARATUS FOR ENHANCING ACTIVATION OF VOICE CONTROLLED DEVICES" and to be assigned to Information Storage Devices, Inc. the disclosure of which is hereby incorporated by reference, verbatim and with the same effect as though it were fully and completely set forth herein.

This application is also related to U.S. patent application Ser. No. 09/316,334, filed by inventors GEILHUFE et al, Attorney Docket No. 042236.P053, entitled "METHOD AND APPARATUS FOR IDENTIFYING VOICE CONTROLLED DEVICES" and to be assigned to Information Storage Devices, Inc. the disclosure of which is hereby incorporated by reference, verbatim and with the same effect as though it were fully and completely set forth herein.

This application is also related to provisional U.S. patent applicaton No. 60/135,301 which has matured into non-provisional U.S. patent application Ser. No. 09/567,858, filed by inventors GEILHUFE et al, Attorney Docket Nos. 042236.P054Z and 042236.P054, entitled "METHOD AND APPARATUS FOR VOICE CONTROLLED DEVICES WITH IMPROVED PHRASE STORAGE, USE, CONVERSION, TRANSFER, AND RECOGNITION" and to be assigned to Information Storage Devices, Inc. the disclosure of which is hereby incorporated by reference, verbatim and with the same effect as though it were fully and completely set forth herein.

This application is also related to United States patent application Serial No. 09/316,666, filed by inventors GEILHUFE et al, Attorney Docket No. 042236.P055, entitled "METHOD AND APPARATUS FOR MACHINE TO MACHINE COMMUNICATION USING SPEECH" and to be assigned to Information Storage Devices, Inc. the disclosure of which is hereby incorporated by reference, verbatim and with the same effect as though it were fully and completely set forth herein.

MICROFICHE APPENDIX

This application contains a microfice appendix consisting of 1 sheet and 72 frames, which is not printed herewith entitled "ISD-SR 300, Embedded Speech Recognition Processor" by Information Storage Devices, Inc. which is hereby incorporated by reference, verbatim and with the same effect as though it were fully and completely set forth herein.

FIELD OF THE INVENTION

This invention relates generally to machine interfaces. More particularly, the invention relates to voice user interfaces for devices.

BACKGROUND OF THE INVENTION

Graphical user interfaces (GUIs) for computers are well known. GUIs provide an intuitive and consistent manner for human interaction with computers. Generally, once a person learns how to use a particular GUI, they can operate any computer or device which operates using the same or similar GUI. Examples of popular GUIs are MAC OS by Apple, and MS Windows by Microsoft. GUIs are now being ported to other devices. For example, the MS Windows GUI has been ported from computers to palm tops, personal organizers, and other devices so that there is a common GUI amongst a number of differing devices. However, as the name implies, GUIs require at least some sort of visual or graphical display and an input device such as a keyboard, mouse, touch pad or touch screen. The displays and the input devices tend to utilize space in an device, require additional components and increase the costs of an device. Thus, it is desirable to eliminate the display and input devices from devices to save costs.

Recently, voice user interfaces (VUIs) have been introduced that utilize speech recognition methods to control a device. However, these prior art VUIs have a number of shortcomings that prohibit them from being universally utilized in all devices. Prior art VUIs are usually difficult to use. Prior art VUIs usually require some sort of display device such as an LCD, or require a manual input device such as keypads or buttons, or require both a display and a manual input device. Additionally, prior art VUIs usually are proprietary and restricted in use to a single make or model of hardware device, or a single type of software application. They usually are not widely available, unlike computer operating systems, and accordingly software programmers can not write applications that operate with the VUI in a variety of device types. Commands associated with prior art VUIs are usually customized for that single type of device or software application. Prior art VUIs usually have additional limitations in supporting multiple users such as how to handle personalization and security. Furthermore, prior art VUIs require that a user know of the existence of the device in advance. Prior art VUIs have not provided ways of determining the presence of devices. Additionally, prior art VUIs usually require a user to read instruction manuals or screen displayed commands to become trained in their use. Prior art VUIs usually do not include audible methods for a user to learn commands. Furthermore, a user may be required to learn how to use multiple prior art VUIs when utilizing multiple voice controlled devices due to a lack of standardization.

Generally, devices controlled by VUIs continue to require some sort of manual control of functions. With some manual control required, a manual input device such as a button, keypad or a set of buttons or keypads is provided. To assure proper manual entry, a display device such as an LCD, LED, or other graphics display device may be provided. For example, many voice activated telephones require that telephone numbers be stored manually. In this case a numeric keypad is usually provided for manual entry. An LCD is usually included to assure proper manual entry and to display the status of the device. A speech synthesis or voice feedback system may be absent from these devices. The addition of buttons and display devices increases the manufacturing cost of devices. It is desirable to be able to eliminate all manual input and display from devices in order to decrease costs. Furthermore, it is more convenient to remotely control devices without requiring specific buttons or displays.

Previously, devices were used by few. Additionally they used near field microphones to listen locally for voices. Many prior devices were fixed in some manner or not readily portable or were server based systems. It is desirable to provide voice control capability for portable devices. It is desirable to provide either near field or far field microphone technology in voice controlled devices. It is desirable to provide low cost voice control capability such that it is included in more devices. However, these desires raise a problem when multiple users of multiple voice controlled devices are in the same area. With multiple users and multiple voice controlled devices within audible range of each other, it makes it difficult for voice controlled devices to discern which user to accept commands from and respond to. For example, consider the case of voice controlled cell phones where one user in an environment of multiple users wants to call home. The user issues a voice activated call home command. If more than one voice controlled cell phone audibly hears the call home command, multiple voice controlled cell phones may respond and start dialing a home telephone number. Previously this was not as significant a problem because there were few voice controlled devices.

Some voice controlled devices are speaker dependent. Speaker dependency refers to a voice controlled device that requires training by a specific user before it may be used with that user. A speaker dependent voice controlled device listens for tonal qualities in how phrases are spoken. Speaker dependent voice controlled devices do not lend themselves to applications where multiple users or speakers are required to use the voice controlled device. This is because they fail to efficiently recognize speech from users that they have not been trained by. It is desirable to provide speaker independent voice controlled devices with a VUI requiring little or no training in order to recognize speech from any user.

In order to achieve high accuracy speech recognition it is important that a voice controlled device avoid responding to speech that isn't directed to it. That is, voice controlled devices should not respond to background conversation, to noises, or to commands to other voice controlled devices. However, filtering out background sounds must not be so effective that it also prevents recognition of speech directed to the voice controlled device. Finding the right mix of rejection of background sounds and recognition of speech directed to a voice controlled device is particularly challenging in speaker-independent systems. In speaker-independent systems, the voice controlled device must be able to respond to a wide range of voices, and therefore can not use a highly restrictive filter for background sounds. In contrast, a speaker-dependent system need only listen for a particular person's voice, and thus can employ a more stringent filter for background sounds. Despite this advantage in speaker dependent systems, filtering out background sounds is still a significant challenge.

In some prior art systems, background conversation has been filtered out by having a user physically press a button in order to activate speech recognition. The disadvantage of this approach is that it requires the user to interact with the voice controlled device physically, rather than strictly by voice or speech. One of the potential advantages of voice controlled devices is that they offer the promise of true hands-free operation. Elimination of the need to press a button to activate speech recognition would go a long way to making this hands-free objective achievable.

Additionally, in locations with a number of people talking, a voice controlled device should disregard all speech unless it is directed to it. For example, if a person says to another person "I'll call John", the cellphone in his pocket should not interpret the "call John" as a command. If there are multiple voice controlled devices in one location, there should be a way to uniquely identify which voice controlled device a user wishes to control. For example, consider a room that may have multiple voice controlled telephones—perhaps a couple of desktop phones, and multiple cellphones—one for each person. If someone were to say "Call 555-1212", each phone may try to place the call unless there was a means for them to disregard certain commands. In the case where a voice controlled device is to be controlled by multiple users, it is desirable for the voice controlled device to know which user is commanding it. For example, a voice controlled desktop phone in a house may be used by a husband, wife and child. Each would could have their own phonebook of frequently called numbers. When the voice controlled device is told "Call Mother", it needs to know which user is issuing the command so that it can call the right person (i.e. should it call the husbands mother, the wife's mother, or the child's mother at her work number?). Additionally, a voice controlled device with multiple users may need a method to enforce security to protect it from unauthorized use or to protect a user's personalized settings from unintentional or malicious interactions by others (including snooping, changing, deleting, or adding to the settings). Furthermore, in a location where there are multiple voice controlled devices, there should be a way to identify the presence of voice controlled devices. For example, consider a traveler arriving at a new hotel room. Upon entering the hotel room, the traveler would like to know what voice controlled devices may be present and how to control them. It is desirable that the identification process be standardized so that all voice controlled devices may be identified in the same way.

In voice controlled devices, it is desirable to store phrases under voice control. A phrase is defined as a single word, or a group of words treated as a unit. This storing might be to set options or create personalized settings. For example, in a voice-controlled telephone, it is desirable to store people's names and phone numbers under voice control into a personalized phone book. At a later time, this phone book can be used to call people by speaking their name (e.g. "Cellphone call John Smith", or "Cellphone call Mother").

Prior art approaches to storing the phrase ("John Smith") operate by storing the phrase in a compressed, uncompressed, or transformed manner that attempts to preserve the actual sound. Detection of the phrase in a command (i.e. detecting that John is to be called in the example above) then relies on a sound-based comparison between the original stored speech sound and the spoken command. Sometimes the stored waveform is transformed into the frequency domain and/or is time adjusted to facilitate the match, but in any case the fundamental operation being performed is one that compares the actual sounds. The stored sound representation and comparison for detection suffers from a number of disadvantages. If a speaker's voice changes, perhaps due to a cold, stress, fatigue, noisy or distorting connection by telephone, or other factors, the comparison typically is not successful and stored phrases are not recognized. Because the phrase is stored as a sound representation, there is no way to extract a text-based representation of the phrase. Additionally, storing a sound representation results in a speaker dependent system. It is unlikely that another person could speak the same phrase using the same sounds in a command and have it be correctly recognized. It would not be reliable, for example, for a secretary to store phonebook entries and a manager to make calls using those entries. It is desirable to provide a speaker independent storage means. Additionally, if the phrases are stored as sound representations, the stored phrases can not be used in another voice controlled device unless the same waveform processing algorithms are used by both voice controlled devices. It is desirable to recognize spoken phrases and store them in a representation such that, once stored, the phrases can be used for speaker independent recognition and can be used by multiple voice controlled devices.

Presently computers and other devices communicate commands and data to other computers or devices using modem, infrared or wireless radio frequency transmission. The transmitted command and/or data are usually of a digital form that only the computer or device may understand. In order for a human user to understand the command or data it must be decoded by a computer and then displayed in some sort of format such as a number or ASCII text on a display. When the command and/or data are transmitted they are usually encoded in some digital format understood by the computer or devices or transmitting equipment. As voice controlled devices become more prevalent, it will be desirable for voice controlled devices to communicate with each other using human-like speech in order to avoid providing additional circuitry for communication between voice controlled devices. It is further desirable to allow multiple voice controlled devices to exchange information machine-to-machine without human user intervention.

BRIEF SUMMARY OF THE INVENTION

The present invention includes a method, apparatus and system as described in the claims. Briefly, a standard voice user interface is provided to control various devices by using standard speech commands. The standard VUI provides a set of standard VUI commands and syntax for the interface between a user and the voice controlled device. The standard VUI commands include an identification phrase to determine if voice controlled devices are available in an environment. Other standard VUI commands provide for determining the names of the voice controlled devices and altering them.

Voice controlled devices are disclosed. A voice controlled device is defined herein as any device that is controlled by speech, which is either audible or non-audible. A voice controlled device may also be referred to herein as an appliance, a machine, a voice controlled appliance, a voice controlled electronic device, a name activated electronic device, a speech controlled device, a voice activated electronic appliance, a voice activated appliance, a voice controlled electronic device, or a self-identifying voice controlled electronic device.

In order to gain access to the functionality of voice controlled devices, a user communicates to the voice controlled device one of its associated appliance names after a period of relative silence. The appliance name may be a default name or a user-assignable name. The voice controlled device may have a plurality of user-assignable names associated with it for providing personalized functionality to each user.

Other aspects of the present invention are described in the detailed description.

BRIEF DESCRIPTIONS OF THE DRAWINGS

FIG. 2 is an illustration of exemplary voice controlled devices.

Like reference numbers and designations in the drawings indicate like elements providing similar functionality.

DETAILED DESCRIPTION OF THE PREFERRED EMBODIMENT

Figure 1A:
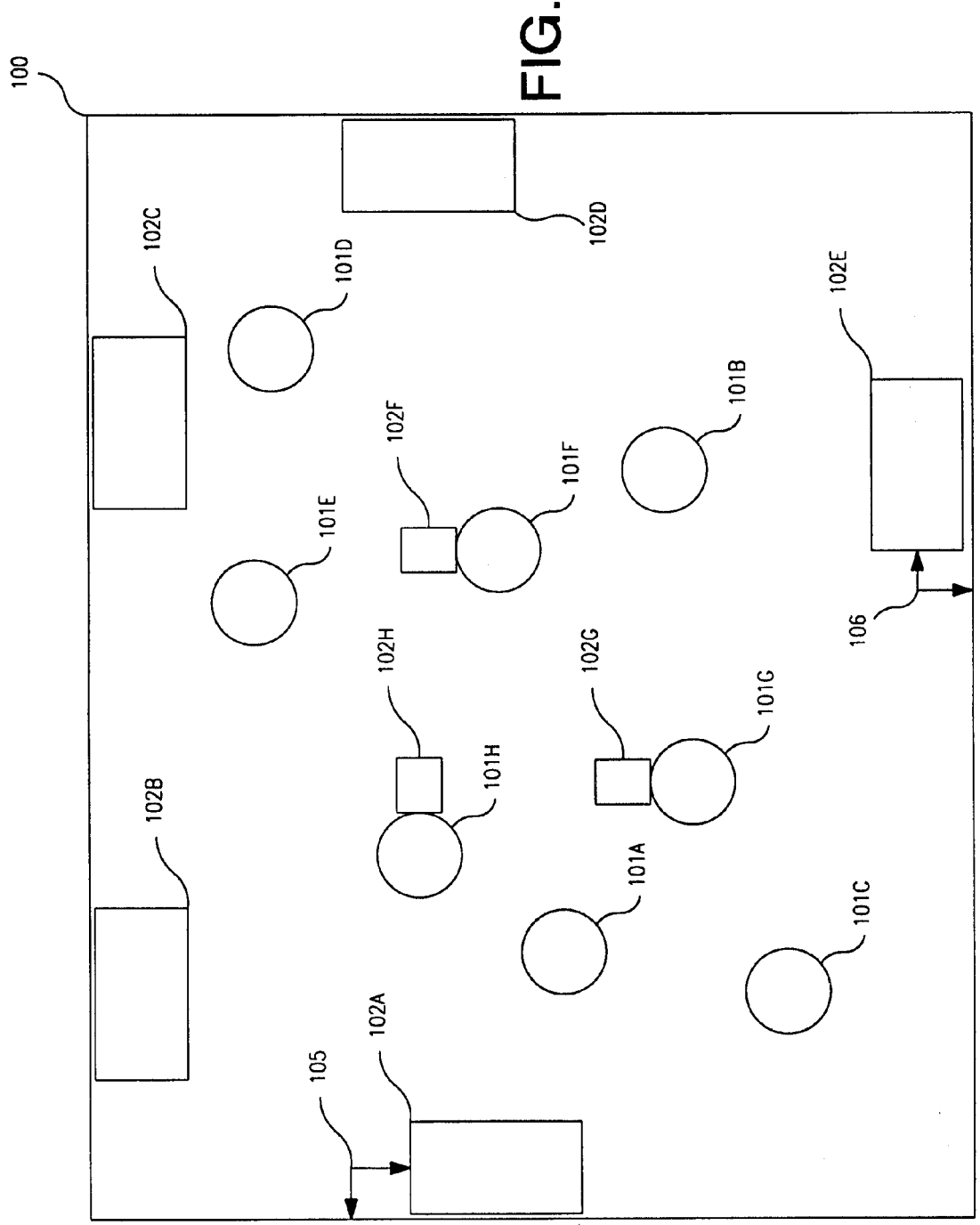
FIG. 1A is an illustration of an environment containing voice controlled devices of the present invention.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

The present invention includes a method, apparatus and system for controlling voice controlled devices. Briefly, a standard voice user interface is provided to control various devices by using standard speech commands. The standard VUI provides a set of core VUI commands and syntax for the interface between a user and the voice controlled device. The core VUI commands include an identification phrase to determine if voice controlled devices are available in an environment. Other core VUI commands provide for determining the names of the voice controlled devices and altering them.

Voice controlled devices are disclosed. A voice controlled device is defined herein as any device that is controlled by speech, which is either audible or non-audible. Audible and non-audible are defined herein later. A voice controlled device may also be referred to herein as an appliance, a machine, a voice controlled appliance, a voice controlled electronic device, a name activated electronic device, a speech controlled device, a voice activated electronic appliance, a voice activated appliance, a voice controlled electronic device, or a self-identifying voice controlled electronic device.

The present invention is controlled by and communicates using audible and non-audible speech. Speech as defined herein for the present invention encompasses a) a signal or information, such that if the signal or information were passed through a suitable device to convert it to variations in air pressure, the signal or information could be heard by a human being and would be considered language, and b) a signal or information comprising actual variations in air pressure, such that if a human being were to hear the signal, the human would consider it language. Audible speech refers to speech that a human can hear unassisted. Non-audible speech refers to any encodings or representations of speech that are not included under the definition of audible speech, including that which may be communicated outside the hearing range of humans and transmission media other than air. The definition of speech includes speech that is emitted from a human and emitted from a machine (including machine speech synthesis, playback of previously recorded human speech such as prompts, or other forms).

Prompts which are communicated by a voice controlled device and phrases which are communicated by a user may be in languages or dialects other than English or a combination of multiple languages. A phrase is defined herein as a single word, or a group of words treated as a unit. A user, as defined herein, is a human or a device, including a voice activated device. Hence "a user's spoken phrase", "a user issuing a command", and all other actions by a user include actions by a device and by a human.

Voice controlled devices include some type of speech recognition in order to be controlled by speech. Speech recognition and voice recognition are used synonymously herein and have the same meaning. Preferably, speaker independent speech recognition systems are used to provide the speech recognition capability of the voice controlled devices. Speaker independent speech recognition systems are responsive to speaker-independent representations of speech. In the preferred embodiment, a speaker-independent representation of speech is a phonetic representation of speech. However, other speaker-independent representations of speech may also be used in accordance with the present invention.

In order to gain access to the full functionality of a voice controlled device with the present invention, a user must communicate to the voice controlled device one of its associated appliance names. The appliance name may include one or more default names or one or more user-assignable names. A voice controlled device may have a plurality of user-assignable names associated with it in order to provide personalized functionality to each user.

Additionally, the present invention provides a way to leave a speech recognition engine on throughout ongoing conversations (including local conversations or those over a telephone link), without having it be falsely triggered by background noise or speech that is not directed to it. To accomplish this, the invention makes use of a naming scheme for voice controlled devices provided by the standard VUI of the present invention. In general, unless a voice controlled device is addressed by its appliance name, it will disregard all speech. (There are a couple of special exceptions to this rule that will be discussed later.) In certain cases the criteria for recognizing a command may be further tightened requiring a voice controlled device to be addressed by its user-assigned appliance name. A voice controlled device may have multiple users, each of whom assign it a unique appliance name using commands of the standard VUI of the present invention. When a voice controlled device is addressed by one of its user-assigned names, the voice controlled device can determine both that it is being addressed, and which user is addressing it. This allows the voice controlled device to use the personalized settings for that particular user. For example, a voice-activated telephone might have four different user-assigned names (e.g. Aardvark, Platypus, Socrates, and Zeus), and each user might have a different telephone number associated with the phonebook entry for Mother. When the first user says "Aardvark call mother", the first user's mother is called. When the second user says "Platypus Call Mother", the second user's mother is called. The command "Geronimo call Mother" would not be acted on by this voice controlled device, since Geronimo is not one of its appliance names.

Another aspect of the present invention improves the recognition accuracy of voice controlled devices. The present invention collectively improves recognition accuracy by requiring first a period of relative silence prior to a phrase directed at the voice controlled device, second the appliance name, and third a valid command. Complete silence is not necessary but a relative silence is needed, where relative silence is defined as a sound level that is quieter than the sound level while the phrase is being spoken. The specific period of relative silence required, and the allowed decibel difference between the relative silence and the sound intensity of the spoken phrase directed at the voice controlled device, will depend on the type of voice controlled device being built, its intended operating environment, the capabilities of the speech recognition system used, and other factors. In some cases, the duration and/or decibel difference of relative silence required may also be varied by the voice controlled device or associated circuits or software, so as to maximize the recognition accuracy obtained in that particular circumstance. In accordance with the standard VUI, each user can assign a voice controlled device a unique name or use a default appliance name. After communicating the appliance name to a voice controlled device, a command must be spoken. Valid input at this point includes special phrases like "Help" or "Cancel", which are part of the standard VUI grammar. If a valid command is not recognized, the voice controlled device rejects the entire sequence and returns to the state where it is waiting for silence. Additionally, depending on the command, one or more additional phrases, typically representing modifiers to the command, may be provided or required (for example, the phone number in the command sequence "<silence> Call 555-1212"). Valid phrases at this point also include special phrases like "Help" or "Cancel", which are part of the standard VUI grammar. Failure to detect valid phrases after the command within a short period of time can be used as a basis for rejecting the entire command sequence, or for prompting the user to clarify his intentions. Either way, this serves as an additional level of accuracy checking. Alternatively, if a phrase is not detected during the short period of time after the command, the command may be performed anyway.

Voice controlled devices can be identified either by visual identification, or acoustic identification, or both. Acoustic identification is defined as including both audible and non-audible communications with the voice controlled device.

Audible and non-audible are defined elsewhere. Visual identification can occur through use of a standard logo or other visual identifier. A blinking LED is another example of a visual identifier. Visual identification is particularly appropriate for voice controlled devices that do not have a speech recognition engine that is always turned on. For example, to minimize battery consumption, battery operated voice controlled devices may require the user to push a switch (or its equivalent, such as flipping open a flip-type cellphone) to activate the speech recognition engine.

Acoustic identification is accomplished by a user saying an identification phrase. An example of an identification phrase is "What is out there?". A voice controlled device may have one or more identification phrases. Any voice controlled device that hears its identification phrase responds to identify its presence. In accordance with the standard VUI, the response is a random delay of up to 2 seconds of silence, followed by a standard signal (for example, one or, more tones or beeps or other sounds), then at least one of the voice controlled device's appliance names, and any applicable basic operation instructions (e.g. "<beep> I am Telephone. You can say Telephone help."). In order to coordinate responses from multiple voice controlled devices in the same communication environment, each voice controlled device must during its silence period listen for another voice controlled device's response, the start of which is marked by the standard signal. Detection of the other voice controlled device's standard signal can be accomplished by any means that is convenient, including by the voice recognition system, by a DSP, by a microprocessor, or by special circuitry. In the event another voice controlled device starts responding during this silence period, the listening voice controlled device must restart its silence timing after the responding voice controlled device finishes. In the event two voice controlled devices start responding at approximately the same time [for example, so that their standard signals overlap in time], they both must back off for a new randomly selected silence delay, but this time the delay must be of up to twice the length of the previous silence delay, but not to exceed 16 seconds.

In order to restrict which voice controlled devices respond to an identification phrase, a user may include a voice controlled device's name in the identification phrase. For example, one could say "Socrates are you out there?" to see if a voice controlled device named Socrates was nearby. Similarly, one could say "Clock are you out there" which would cause all voice controlled devices with an appliance name of Clock (whether a default appliance name or a user appliance name) to respond. A possible variation is that voice controlled devices may respond with some response other than their names, as for example, might be needed for security reasons.

A voice controlled device may use both visual and acoustic identification methods. For example, even though a speech recognition engine is continuously on, it may still display the visual logo and/or other visual identifier. Similarly, in a voice controlled device that requires manual activation of the speech engine, once enabled, the engine could then be responsive to the command "What is out there?"

In another aspect of the present invention, the initial storage of a user's spoken phrase (for example, when making a new phonebook entry under voice control) is processed by the speaker-independent speech recognition engine of the voice controlled devices. This engine returns a speaker-independent phonetic representation of the phrase. This speaker-independent phonetic representation is what is stored.

When a command is issued by a user, it is also processed by the speaker-independent speech recognition engine of the present invention. This could be the same speaker-independent engine use for storing the original entries, or a completely different speaker-independent engine. In either case, the engine returns a speaker-independent phonetic representation of the command sequence. This speaker-independent phonetic representation can be compared to earlier stored phonetic representations to determine whether the command is recognizable.

By converting both the stored spoken entries and any commands to speaker-independent phonetic representation a number of advantages are provided.

Recognition will be reliable even if the user's voice has changed, perhaps due to a sickness, stress, fatigue, transmission over a noisy or distorting phone link, or other factors that might change a human user's or machine user's speech. Text-based information can be stored and then recognized.

Recognition will be reliable even if some other user had stored the original voice phrase.

Recognition can be speaker-independent, even for user-stored commands and phrases.

Stored entries originating from text sources and from different speakers can all be combined and reliably for recognition.

The use of speaker-independent phonetic representations facilitates upgrading to improved recognition engines as they become available. Improved speech recognition engines can use existing stored information without impacting reliability or requiring re-storage, since all stored entries are held in phonetic form. New information stored using the improved speech recognition engines can be used on equipment with older recognition engines. Old and new generations of equipment can interoperate without prior coordination by using phonetic representations. This allows, for example, two PDAs to exchange voice-stored phonebook entries and provide reliable recognition to the new users of that information. Finally, there are no legacy restrictions to hold back or restrict future development of speaker-independent recognition engines as long as they can create phonetic representations, unlike waveform-storage based systems, which must always be able to perform exactly the same legacy waveform transformations.

VOICE CONTROLLED DEVICES

Referring now to FIG. 1A, environment 100 is illustrated. Environment 100 may be any communication environment such as an office, a conference room, a hotel room, or any location where voice controlled devices may be located. Within environment 100, there are a number of human users 101A–101H, represented by circles. Also within the environment 100, are voice controlled devices 102A–102H, represented by squares and rectangles, each operationally controlled by the standard voice user interface (VUI) of the present invention. Voice controlled devices 102A–102E, represented by rectangles, are fixed within the environment 100. Voice controlled devices 102F–102H, represented by squares, are mobile voice controlled devices that are associated with human users 101F–101H respectively. Voice controlled devices 102A–102H may be existing or future devices. Voice controlled devices 102A–102E may be commonly associated with a user's automobile, home, office, factory, hotel or other locations where human users may be found. Alternatively, if the voice controlled devices 102A–102E are to be controlled by non-audible speech, voice controlled devices may be located anywhere.

In the present invention, the standard VUI allows a user to associate a user-assignable name with these voice controlled devices 102A–102H. The user-assignable name of the voice controlled device may be generic such as telephone, clock, or light. Alternatively, the name may be personalized such as those ordinarily given to humans such as John, Jim, or George. In either case, the voice controlled devices 102A–102H while constantly listening will not respond to commands until it recognizes one of its names (user-assigned or default). Although any name can be assigned to a voice controlled device, to minimize confusion between the voice controlled device and real people, users may choose to use unusual names such as Aardvark or Socrates, which are unlikely to occur during normal conversation. With reference to FIG. 1A, consider the environment 100 to be a conference room where human users 101A–101H are meeting. Further assume that voice controlled device 102A is a telephone having speaker phone capabilities in the conference room 100 and the appliance name is Telephone. The human user such as 101A would first call out the name of the Telephone before desiring to give commands to that voice controlled device. By providing names to the voice controlled devices, the voice controlled devices can properly respond to given commands and avoid confusion between multiple users and voice controlled devices. The voice controlled device may be a telephone, an organizer, a calculator, a light fixture, a stereo system, a microwave over, a TV set, a washer, a dryer, a heating system, a cooling system, or practically any system. Voice controlled devices 102A–102H may include an audible communications interface (ACI) in order to listen to commands and data input from human users 101A–101H and audibly notify a user that the command or data was properly interpreted and executed. Voice controlled devices 102A–102H further include a speech recognition and synthesis system (SRS). The speech recognition of the SRS provides for interpreting speech in different dialects independent of which user is speaking, and independent of whether the user is a human or device. While the preferred embodiments of the present invention utilize a speaker independent voice recognition system, the present invention is also compatable with speaker dependent voice recognition systems. The SRS may operate with one or more than one language. The speech synthesis of the SRS provides for generation of speech responses, status commands, or data by the voice controlled devices which may be audibly communicated or non-audibly communicated. Speech synthesis, also refered to herein as speech generation, is defined herein to include any method of responding with speech (audible or non-audible), including but not limited to, speech recording, storage and playback systems, pre-recorded vocabulary systems with playback, sophisticated speech synthesis systems generating utterances from a combination of characters, and some combination of the above. Preferably the voice controlled devices contain both a speech recording, storage and playback system and a pre-recorded vocabulary system with playback.

Figure 1B:
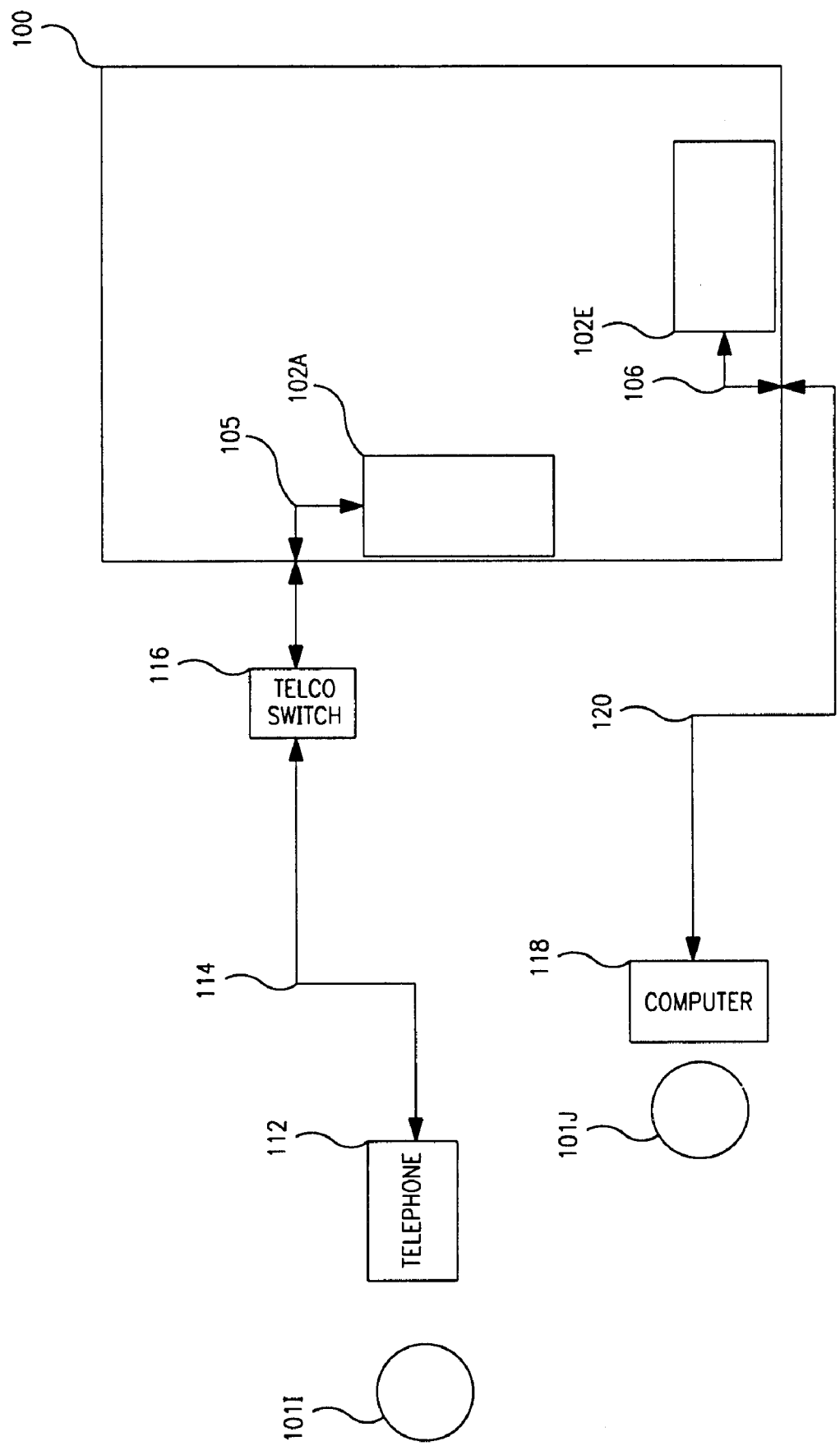
FIG. 1B is an illustration of remote communications with the voice controlled devices in the environment illustrated in FIG. 1A.

Voice controlled devices 102A–102H may optionally include a communications interface (ECI) for providing remote control of voice controlled device via wireless or wired means using non-audible voice or speech. As illustrated in FIG. 1A, voice controlled device 102A has a connection 105 for connection to a telephone system. In this manner, the voice controlled device 102A may remotely communicate to a user and accept and acknowledge commands. Referring now to FIG. 1B, the human user 101I communicates by telephone 112 over the wired or wireless transmission media 114 over the telephone company switch 116. The telephone company switch 116 is connected by a wire means or wireless means through connection 105 to the voice controlled device 102A. Telephone 112 may be a wireless or wired telephone. In this matter, human user 101I may remotely interface to a voice controlled device 102A within a communications environment 100. Alternatively, a voice controlled device such as voice controlled device 102E may be remotely controlled over a network by a remote computer 118. In this case, a remote human user 101J can send voice commands or instructions through remote computer 118 which is coupled to the voice controlled device 102E through the network connection 120 and connection 106. The network connection 120 may be a wireless or wired connection, realtime or store-and-forward, through or a computer network such as the Internet. There are a wide variety of ways that a remote user can be connected to a voice controlled device, including but not limited to, the use of wired and wireless connections. Wired connections may include, but are not limited to, realtime communications systems such as the telephone system and realtime Internet connections, store-and-forward systems such as email of voice representations and other non-realtime Internet protocols. Wireless systems may include, but are not limited to, radio and infrared systems. Any of these alternatives can include circuit-based systems and packet-based systems, and can include analog and digital systems. Any of these alternatives can be used with or without various modulation and/or encoding and/or encryption schemes.

Referring now to FIG. 2, exemplary voice controlled devices 102I–102M are illustrated. The voice controlled device 102I is exemplary of white goods such as freezers, refrigerators, washers, dryers, air conditioners, heating units, microwave ovens, ovens, and stoves. Voice controlled device 102J is exemplary of voice controlled devices requiring an optional communication interface (ECI). This may include voice controlled devices for consumer electronics such as television, video cassette recorders, stereos, camcorders, tape recorders, dictation units, alarm clocks, and clock radios as well as telephone products such as standard wired telephones, telephone answering machines, light switches, alarm systems, computing devices, Internet access devices, and servers, etc. Voice controlled device 102K is exemplary of portable or wireless systems such as cellular telephones, walkman style systems, camcorders, and personal digital systems. Voice controlled device 102L is exemplary of automobile voice controlled systems such as car cellular telephone systems, automobile radio systems, car navigation systems, HAV (heating, air conditioning and ventilation) systems, and other control systems for an automobile. Voice controlled device 102M is exemplary of remote controlled devices, such as voicemail systems.

Voice controlled device 102I includes an audible communications interface (ACI) 202, a speech recognition and synthesis system (SRS) 204, and an appliance peripheral and control circuit (APCC) 206. The ACI 202 is coupled to SRS 204 and SRS 204 is coupled to APCC 206 In the voice controlled device 102I, ACI 202 is its primary means of speech communication.

Voice controlled device 102J includes ACI 202, SRS 204, APCC 206, communications interface (ECI) 207, and connection 208. ACI 202 is coupled to SRS 204. APCC 206 is coupled to SRS 204. ECI 207 couples to SRS 204 and connection 208 couples to the ECI 207. Voice controlled device 102J can alternatively communicate using speech or voice communication signals through ACI 202 or ECI 207. Voice controlled device 102K includes ACI 202, SRS 204, APCC 206, and an antenna 208.

Voice controlled device 102K can communicate using audible speech signals through the ACI 202 or using encoded speech signals through the ECI 207. ECI 207 couples to APCC 206. ECI 207 also couples to Connection 212. Connection 212 could, for example, be an antenna or infrared port. Voice controlled device 102L also includes an ACI 202, SRS 204, APCC 206, and an antenna 209. ACI 202 couples to SRS 204. SRS 204 couples to APCC 206. Antenna 209 couples to APCC 206. Voice controlled device 102L can communicate by means of ACI 202 and APCC 206 through antenna 209.

Voice controlled device 102M includes an APCC 206, SRS 204, an ECI 207, and connection 210. Connection 210 may be a wired or wireless connection, including an antenna. SRS 204 couples to APCC 206 and also to ECI 207. Connection 210 couples to ECI 207. Voice controlled device 102M can communicate via ECI 207 over connection 210.

The APCC 206 represents the elements of the voice controlled device 102 that are to be controlled. For example, in the case of white goods, the items to be controlled may be temperature, a time setting, a power setting, or a cycle depending on the application. In the case of consumer electronics, the APCC 206 may consist of those items normally associated with buttons, switches, or knobs. In the case of telephone products, the APCC 206 may represent the buttons, the dials, the display devices, and the circuitry or radio equipment for making wired or wireless calls. In the case of automobile systems, the APCC 206 may represent instrumentation panels, temperature knobs, navigational systems, the automobile radios channels, volume, and frequency characteristics.

Figure 3:
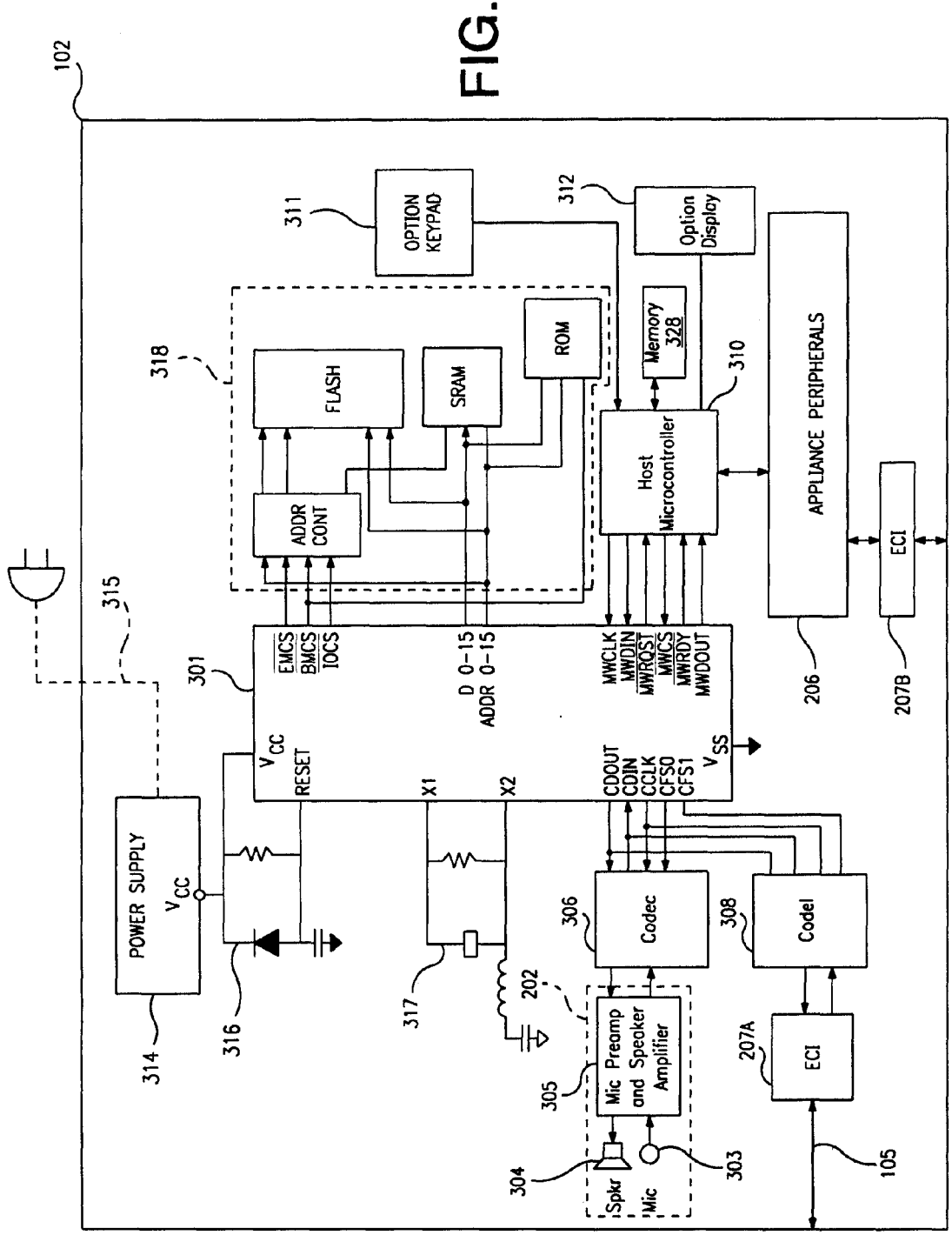
FIG. 3 is a detailed block diagram of the voice controlled device of the present invention.

Referring now to FIG. 3, the voice controlled device 102 is illustrated. Voice controlled device 102, illustrated in FIG. 3, is exemplary of the functional blocks within voice controlled devices described herein. Voice controlled device 102 includes the ACI 202, the APCC 206 and the SRS 204. The voice controlled device 102 may also have an ECI 207 such as ECI 207A or ECI 207B.

The ACI 202 illustrated in FIG. 3 includes microphone 303, speaker 304, and amplifiers 305. The SRS 204 as illustrated in FIG. 3 includes the voice communication chip 301, coder/decoder (CODEC) 306 and 308, host microcontroller 310, power supply 314, power on reset circuit 316, quartz crystal oscillator circuit 317, memory 318, and memory 328. The SRS 204 may optionally include an AC power supply connection 315, an optional keypad 311 or an optional display 312. For bidirectional communication of audible speech, such as for local commands, prompts and data, the speech communication path is through the VCC 301, CODEC 306, and the ACI 202. For bidirectional communication of non-audible speech, such as for remote commands, prompts and data, the non-audible speech communication path is through the VCC 301, CODEC 308, ECI 207A or the VCC 301, host microcontroller 310, APCC 206, and ECI 207B. The ECI 207 may provide for a wired or wireless link such as through a telephone network, computer network, internet, radio frequency link, or infrared link.

Voice communication chip 301 provides the voice controlled device 102 with a capability of communication via speech using the standard voice user interface of the present invention. Microphone 303 provides the voice controlled device 102 with the capability of listening for audible speech, such as voice commands and the device's appliance names. Microphone 303 may be a near field or far field microphone depending upon the application. For example, near field microphones may be preferable in portable cell phones where a user's mouth is close while far field microphones may be preferable in car cell phones where a user's mouth is a distance away. Speaker 303 allows the voice controlled device 102 to respond using speech such as for acknowledging receipt of its name or commands. Amplifiers 305 provides amplification for the voice or speech signals received by the microphone 303. Additionally, the amplifiers 305 allow amplification of representations of voice signals from the CODEC 306 out through the speakers 303 such that a human user 101 can properly interface to the voice controlled device 102.

Microphone 303 and Speaker 304 are each transducers for converting between audible speech and representations of speech. CODEC 306 encodes representations of speech from the ACI 202 into an encoded speech signal for VCC 301. In addition, CODEC 306 decodes an encoded speech signal from the VCC 301 into an representation of speech for audible communication through the ACI 202.

Alternatively, non-audible speech signals may be bi-directionally communicated by the voice controlled device 102. In this case, VCC 301 provides encoded speech signals to CODEC 308 for decoding. CODEC 308 decodes the encoder speech signal and provides it to the ECI 207A for communication over the connection 105. Speech signals may be received over the connection 105 and provided to the ECI 207A. The ECI 207A couples the speech signals into the CODEC 308 for encoding. CODEC 308 encodes the speech signals into encoded speech signals, which are coupled into the VCC 301.

Speech signals may also be electronically communicated through the APCC 206. Speech signals from the VCC 301 for transmission are passed to the microcontroller 310. Microcontroller 310 couples these into the APCC 206, which transmits the speech signals out to the ECI 207B. Speech signals to be received by the voice controlled device 102 may be received by the ECI 207B and passed to the APCC 206. The APCC 206 then may couple these received speech signals to the microcontroller 310, which passes these onto the VCC 301 for recognition.

The voice controlled device 102 controls the APCC 206 by means of signals from the host microcontroller 310. The host microcontroller 310 is coupled to the APCC 206 to facilitate this control. Voice controlled device 102 may optionally have a keypad 311 coupled to the microcontroller 310 as a further input means. Keypad may be a power button, a push to talk button or a security code input means, in addition to optionally being used to input other information. Voice controlled device 102 may optionally include a display 312 coupled to the host microcontroller 310 in order to visually display its status or other items of interest to a user. However, the voice controlled device can function generally without the optional keypad 311 or the optional display 312.

The voice controlled device 102 includes power supply 314.Power supply 314 may generate power from a DC supply source or an AC supply source, or from both. The source of DC supply may be a battery, solar cell, or other DC source. In the case of an AC supply source, the optional AC power cord 315 is provided. VCA 102 includes a power on reset circuit 316 to reset its system when the power supply 314 is turned on.

Quartz crystal oscillator circuit 317 in conjunction with other circuitry within the VCC 301 provides an accurate oscillation input to the VCC 301 for generation of clock signals.

Memory 318 is coupled to VCC 301 and provides rewritable non-volatile and volatile memory as well as a read only memory. These typically are a flash RAM, a static RAM, and a ROM. Memory 318 is used to store programs as well as store pre-recorded and recorded phrases. Additionally, memory 318 provides scratch memory for program operation. As is standard practice in the industry, the types of memories used may vary depending on the specific voice controlled device being constructed. Program storage for the present invention may be permanent, as with a ROM, non-volatile but changeable, as with a flash, or volatile, as in a RAM, in which case the program could be downloaded from a non-volatile memory, or from a remote source.

Memory 328 may be volatile memory, non-volatile memory, or a mixture. If only volatile memory is used, its contents can be downloaded from another location for initialization. The size and capabilities of Memory 328 will depend on the type of voice controlled device being built. Alternatively, memory may be substituted in some cases for a type of magnetic, optical or other type of storage medium.

In the voice controlled device 102, VCC 301 may additionally include the functionality of the host microcontroller 310 such that only one processing unit is contained within the voice controlled device 102. Similarly, the APCC 206, codecs 306 and/or 308, ECI 207A, ECI 207B, memory 318, memory 328, amplifiers 305, or other elements maybe integrated into VCC 301, as is customary in the industry as ever-increasing levels of integration are achieved.

Figure 4:
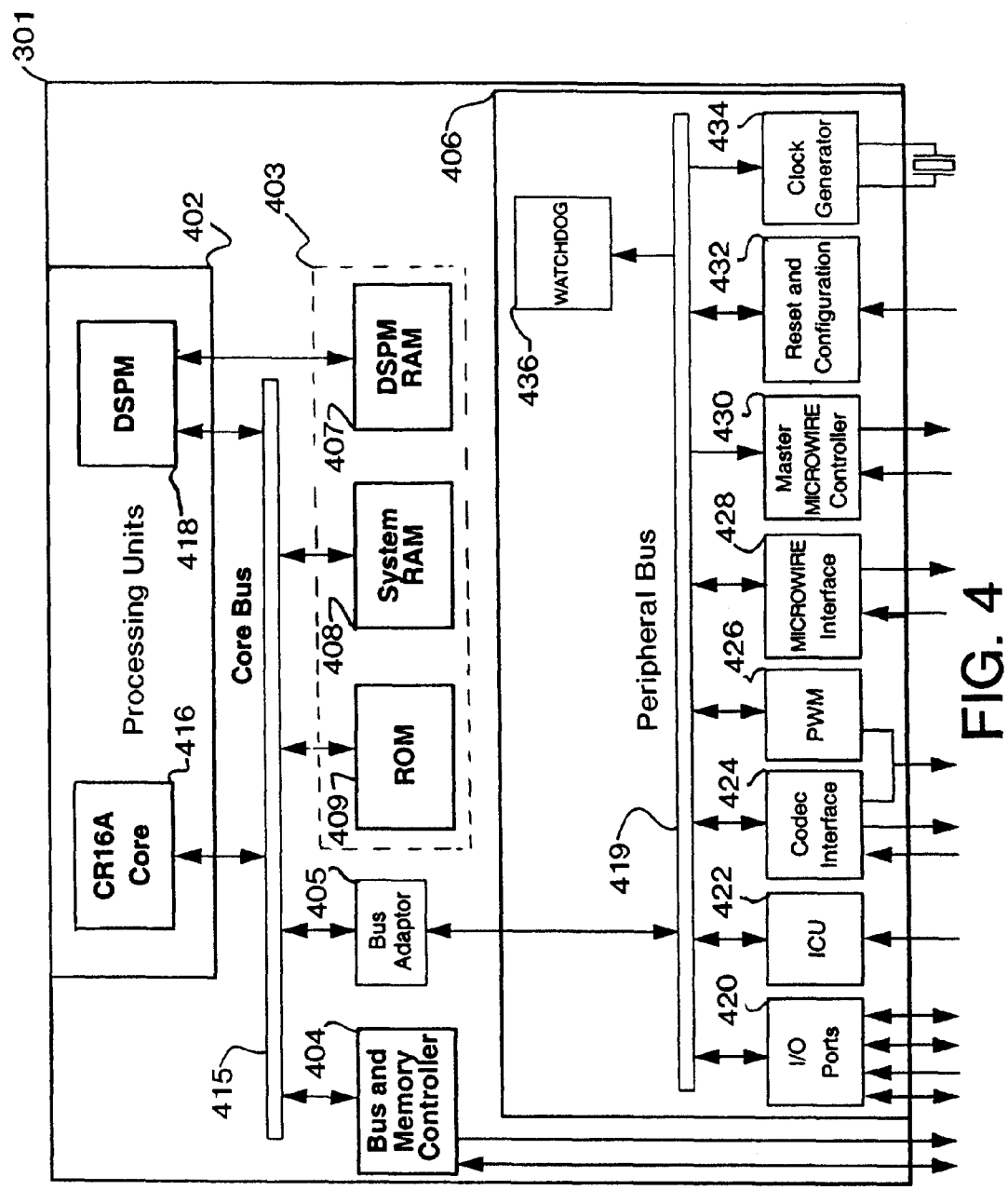
FIG. 4 is a detailed block diagram of a voice communication chip.

Referring now to FIG. 4, a block diagram of the voice communication chip (VCC) 301 is illustrated. The voice communication chip 301 is an integrated circuit and includes the processing units 402, memory units 403, a Bus and Memory Controller (BMC) 404, a bus adapter 405, and Peripherals 406. The voice communication chip 301 is further described in the microfiche appendix entitled "ISD-SR 300, Embedded Speech Recognition Processor" by Information Storage Devices, Inc. The processing units 402 includes a microprocessor and a digital signal processing module (DSPM). The memory units 403 include a DSPM random access memory (RAM) 407, a system RAM 408, and a read only memory (ROM) 409. The peripherals 406 include I/O ports 420, an Interrupt Control Unit (ICU) 422, a coder/de-coder (CODEC) interface 424, a Pulse Width Modulator (PWM) 426, a MICROWIRE interface 428, Master MICROWIRE controller 430, a reset and configuration controller 432, a clock generator 434 and a WATCH-DOG timer 436. In order to communicate effectively, the voice communication chip 301 includes a core bus 415 and a peripheral bus interconnecting the components as shown in FIG. 4.

The microprocessor 416 is a general purpose 16-bit microprocessor core with a RISC architecture. The microprocessor 416 is responsible for integer arithmetic logic and program control. The DSP Module (DSPM) 418 performs DSP arithmetic. ROM 409 and system RAM 408 are used for the storage of programs and data. DSPM RAM 407 can be accessed directly by the DSPM 418. When the DSPM 418 is idle, the microprocessor 416 can access the DSPM RAM 407.

The Bus and Memory Controller (BMC) 404 controls access to off-chip devices, such as DRAM, Expansion Memory, off-chip Base Memory and I/O Expansion. The I/O ports 420 provide the interface to devices coupled to the voice communication chip 301. The I/O ports 420 represents twenty-six I/O pins of the voice communication chip 301. Using the internal ROM 409 for program memory without expansion options, sixteen I/O pins can be individually configured for input or output, eight I/O pins dedicated for output only and two I/O pins dedicated for input only. The ICU 422 provides the capability of processing five maskable interrupts (four internal and one external) and three internal Non-Maskable Interrupts (NMIs). The CODEC interface 424 provides a direct interface to one CODEC device 306 in the case of ACI 202 only or two CODEC devices 306 and 308 in the case of ACI 202 and ECI 207A. The Pulse Width Modulator (PWM) 426 generates a square wave with a fixed frequency and a variable duty cycle. The MICROWIRE interface 428 allows serial communication with the host microcontroller 310. The Master MICROWIRE controller 430 allows interface to serial flash memory and other peripherals. The reset and configuration block 432 controls definition of the environment of the voice communication chip 301 during reset and handles software controlled configurations. Some of the functions within the voice communication chip 301 are mutually exclusive. Selection among the alternatives is made upon reset or via a Module Configuration register. The clock generator 434 interfaces to the quartz crystal oscillator circuit 317 to provide clocks for the various blocks of the voice communication chip including a real-time timer. The clock generator can also be used to reduce power consumption by setting the voice communication chip 301 into a powerdown mode and returning it into normal operation mode when necessary. When the voice communication chip 301 is in power-down mode, some of its functions are disabled and contents of some registers are altered. The watchdog timer 436 generates a non-maskable interrupt whenever software loses control of the processing units 402 and at the expiration of a time period when the voice communication chip 301 is in a power-down mode.

Standard Voice User Interface

Similar to computer operating systems providing a GUI, the standard voice user interface (VUI) can be thought as being provided by a standard VUI operating system code. The standard VUI operating across a wide array of voice controlled devices allows a user to interface any one of the voice controlled devices including those a user has never previously interacted with. Once a user is familiar with the standard VUI, they can walk up to and immediately start using any voice controlled device operating with the standard VUI. The standard VUI operating system code has specific standardized commands and procedures in which to operate a voice controlled device. These standardized commands and procedures are universal to machines executing the standard VUI operating system code. Voice controlled application software, operating with the standard VUI operating system code, can be written to customize voice controlled devices to specific applications. The voice controlled application software has voice commands specific to the application to which the voice controlled device is used. A particular voice controlled device may also have additional special features that extend the core capabilities of the standard VUI.

Some of the standard VUI functionality in the core VUI include a way to discover the presence of voice controlled devices, a core common set of commands for all voice controlled devices, a way to learn what commands (both core commands and appliance-specific commands) the voice controlled device will respond to, a vocalized help system to assist a user without the use of a manual or display, a way to personalize the voice controlled device to a user with user assignable settings, security mechanisms to control use of voice controlled devices to authorized users and protect user assignable settings and information from other users, and standard ways for a user to interact with voice controlled devices for common operations (e.g. selecting yes or no, listing and selecting items from a list of options, handling errors gracefully, etc.).

The standard VUI includes an API (Applications Programming Interface) to allow software developers to write custom voice controlled applications that interface and operate with the standard VUI and extend the voice controlled command set.

Figure 5:
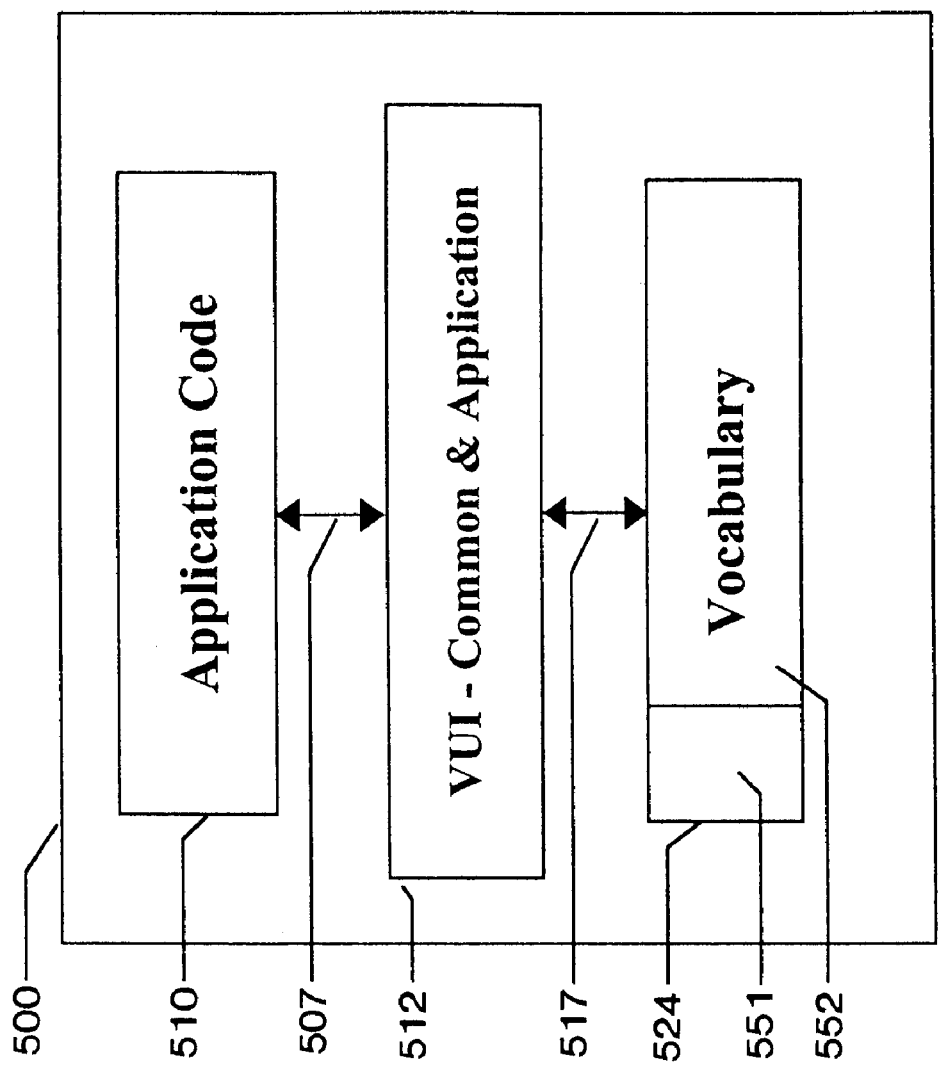
FIG. 5 is a block diagram of the standard voice user interface of the present invention.

Referring now to FIG. 5, a block diagram illustrates the Software 500 for controlling Voice Controlled Device 102 and which provides the standard VUI and other functionality. The Software 500 includes Application Code 510, a VUI software module 512 and a Vocabulary 524. Application code 510 may be further modified to support more than one application, representing multiple application code modules, to provide for further customization of a voice controlled device 102. The Vocabulary 524 contains the phrases to be detected. The phrases within the Vocabulary are divided into groups called Topics, of which there may be one or more. In FIG. 5, the Vocabulary 524 consists of two Topics, Topic 551 and Topic 552.

Typically, Application Code 510 interfaces to the VUI software 512 through the Application Programming Interface (API) 507. The VUI software 512 provides special services to the Application Code 510 related to voice interface, including recognition and prompting. The interrelationship between the VUI software 512 and the application code 510 is analogous to that between Microsoft's MS Windows and Microsoft Word. Microsoft Windows provides special services to Microsoft Word related to displaying items on a screen and receiving mouse and keyboard inputs.

Generally, the Application Code 510 may be stored in host memory and executed by the host microcontroller 310. However, the functionality of the host microcontroller 310 can be embedded into the VCC 301 such that only one device or processor and one memory or storage device is needed to execute the code associated with the software 500.

All phrases that can be recognized, including those phrases for the core and application specific commands, are included in the Vocabulary 524. The VUI software module 512 can directly access the vocabulary phrases, for example for use during recognition. The VUI software module 512 can also process tokens. Tokens abstractly relate to the phrases within the Topics 551–552. Tokens are integer numbers. For example, the phrase for 'dial' might have a token value of '5', and the phrase for 'hangup' might have a token value of '6'. There is a token value assigned to every phrase that can be recognized. Because the VUI software module 512 can process tokens related to the vocabulary file 524, it can refer to phrases without having to directly access them. This makes it possible to change languages (from English to French, etc.) without modifying the VUI software module 502. Thus, the standard VUI will function using different dialects or languages simply by modifying the vocabulary file 524.

Core capabilities of the standard VUI operating in a voice controlled device allow a user to: name the voice controlled device, identify the presence of voice controlled devices, activate a user's previously stored personalized preferences, recover from misrecognitions by canceling an operation, use a Help function to identify the commands and options that can be used with the voice controlled device, use a standard core set of commands and use other additional commands, confident that they follow a standard syntax. (Although the syntax of commands is common, the specific list of commands on any voice controlled device will depend on the nature of the voice controlled device). The standard VUI also includes standard functions for the following user interactions for the API: GETYESNO—Accepting a Yes/No response from the user; GETRESPONSE—Accepting an arbitrary input from the user; GETRESPONSEPLUS—Accepting an arbitrary input from the user, with enhanced error recovery features; LISTANDSELECT—Providing the user with a list of choices, and allowing the user to select one; and ACOUSTICADDWORD Adding a phrase that can thereafter be recognized.

In orderly to properly function with the standard VUI, the SRS 204 of the voice controlled device 102 can provide continuous recognition of speech and digits when powered up. However, pauses exceeding certain durations may be recognized by the SRS 204 as marking the end of a command or providing an indication that an incomplete command sequence has been received.

Names

A key element of the standard VUI of the present invention is that each voice controlled device has one or more appliance names, each of which is a phrase. The initial appliance name is a default name for a voice controlled device programmed by the manufacturer at the factory. However, users can generally assign a user-assigned appliance name of their choosing to a voice controlled device. Naming a voice controlled device is different from other kinds of naming, such as naming people. A person has a single (first) name that can be used by everyone who wants to talk with them. In contrast, with naming of voice controlled devices, every user of a voice controlled device usually gives the voice controlled device a different, unique name. Accordingly, a voice controlled device may have as many names as it has users.

When a user addresses a voice controlled device by name two things happen. First, when the voice controlled device recognizes one of its names, the voice controlled device is notified that it is being addressed and will need to listen for a command. Second, since each user usually employs a different name for a voice controlled device, it is informed of a user's identity (speaker identification). If a user has stored preferences related to the functionality of the voice controlled device, the voice controlled device can personalize itself to the preferences of that user.

To illustrate this naming concept, consider the following example of a desktop telephone, the voice controlled device, having two users. User 1 has named the phone "Aardvark" and user 2 named the phone "Platypus". If the phone hears "Aardvark Call Mom", the phone will recognize that it is being addressed by user 1 and it should use User 1's phonebook. Accordingly, it will dial the number for "Mom" programmed by User 1. Similarly, if the phone hears "Platypus Call Mom", it will recognize that user 2 is addressing it, and it will dial the number for "Mom" programmed by user 2.

In order to minimize false recognition, it is preferable that users assign names to the voice controlled devices that are generally not spoken during normal speech. Choosing unusual names helps ensure that two voice controlled devices within audible range of each other don't have identical names (perhaps assigned by different users). A maximum time limit for saying the phrase name may be required in some cases due to memory limitations in the voice controlled device.

Referring now to FIGS. 6A–6E, flow charts of the detailed operation of the standard VUI with voice controlled devices 102 are described. In the flow charts of FIGS. 6A–6E, a solid box shows a phrase communicated by a user (placed in quotes) or a user action (no quotes). A dotted box shows a phrase communicated by the voice controlled device (in quotes) or an action taken (no quotes). In the case where there is a solid box directly below a dotted box, a path exiting from the right of a dotted box is taken if the action within the current dotted box is completed normally and the path to the solid box below a dotted box is taken if an unusual event occurs. Generally, the solid box directly below the dotted box indicates the unusual event.

Standard VUI Command Syntax

Figure 6A:
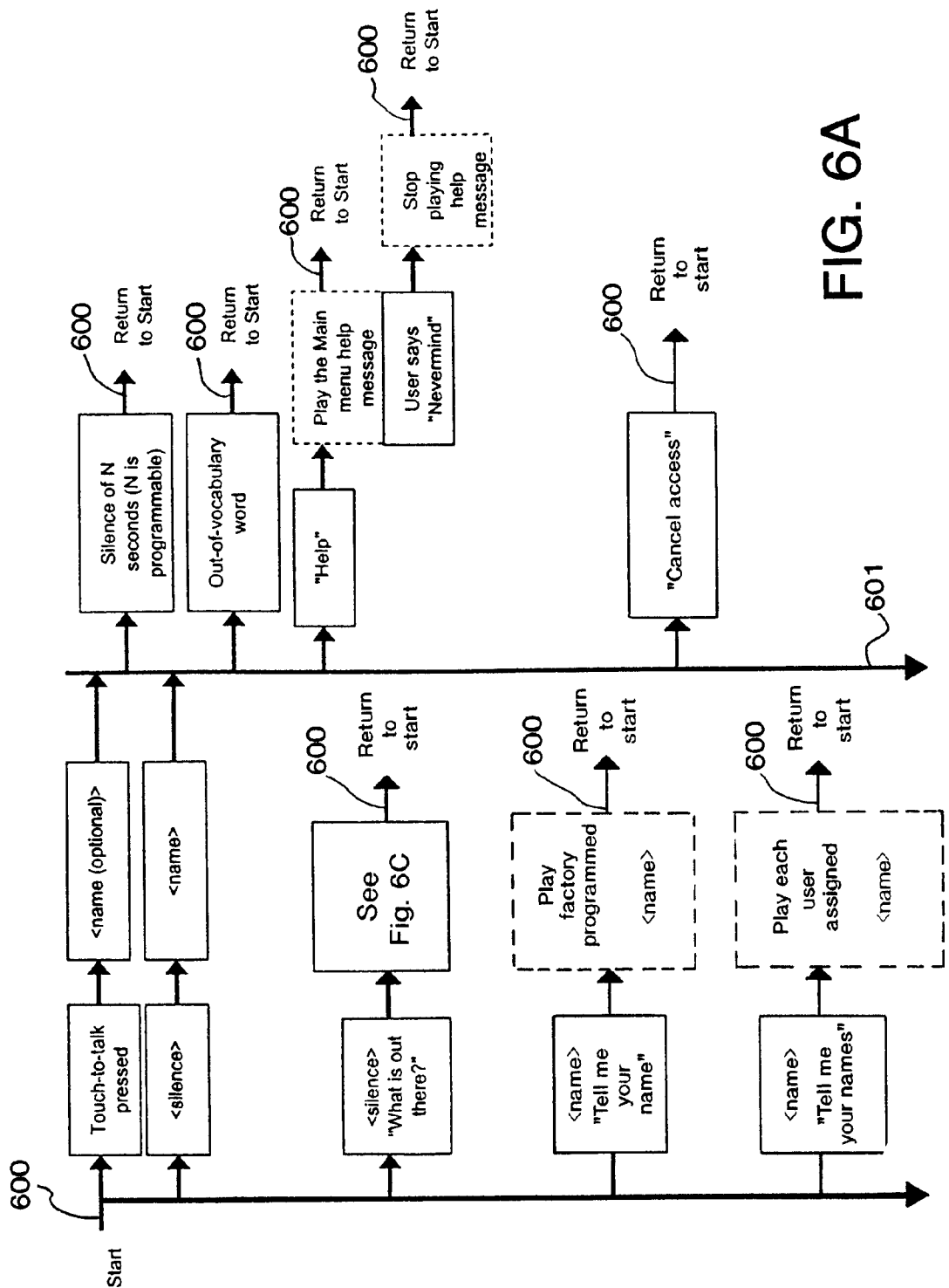
FIGS. 6A–6C are flow charts of the core command structure for the standard voice user interface of the present invention.

Referring now to FIG. 6A, the general syntax for all voice commands is:

<silence><name> <command> <modifiers & variables>.

The <silence> is a period of relative silence during which the user is not speaking although background noise and background speech may still be present. The <name> is the appliance name associated with a voice controlled device 102. The <command> is an operation that a user wants performed. The <modifiers & variables> consist of additional information needed by some commands. The SRS 204 recognizes the elements in their syntax in order for a user to control voice controlled devices.

Most voice controlled devices will continuously listen for the voice command sequence. When a voice controlled device hears its <name>, it knows that the following <command> is intended for it. Since each user has a different <name> for a voice controlled device, the <name> also uniquely identifies the user, allowing the voice controlled device to select that user's personalization settings. Commands include core VUI commands included with all voice controlled devices, and commands specific to a given application, all of which are stored within the vocabulary 524.

Requiring <silence> before detection of <name> helps prevent false detection of <name> during normal conversational speech (i.e. during periods when the user is speaking conversationally to other users and not to the voice controlled device). In all cases, the duration of <silence> can be configured by the manufacturer and can range from 0 (no <silence> required) to a second or more. Typically it will be about a quarter of a second.

Examples of voice command sequences that might be used with a voice controlled device such as a telephone named Aardvark include "Aardvark Call The Office", "Aardvark Dial 1-800-55-1212", and "Aardvark Hang-up". (In the command examples and descriptions provided, for the sake of brevity the <silence> is often not shown, and even where it is shown or described, the option always exists of a manufacturer choosing to use a silence duration of zero.)

There are two special cases where the command syntax is permitted to differ from the general syntax. The first special case is in voice controlled devices that do not continuously listen for <silence><name>. For example, in some battery operated applications, power consumption limitations may require the VCC 301 in the voice controlled device 102 to be powered down during idle periods. Another example is a voice controlled device located where false recognition of a name would have undesirable results, for example, a desktop phone in a conference room during a presentation. A third example is voice controlled devices where there is a high risk of false recognition, for example, where multiple conversations can be heard.

For these types of situations, an alternate command syntax is used in conjunction with a button or switch of some type. The first alternate command syntax is:

<activation of a switch> <silence (optional)> <name> <command> <modifiers & variables>.

In this syntax, the <activation of a switch> means the user presses a button or performs some other mechanical act (e.g. opening a flip-style cell phone) to activate the recognition capability.

A second special case is where the user normally enters a series of commands in quick succession. For these cases, the users can identify themselves once to the voice controlled device using a password protection method, or by issuing a command that includes the voice controlled device's appliances <name>, and thereafter continue entering commands. The second alternate command syntax (in this example, for three successive commands) is:

<silence> <name> <command> <modifiers & variables as needed>

<silence> <name (optional)> <command> <modifiers & variables as needed>

<silence> <name (optional)> <command> <modifiers & variables as needed>

With this syntax, the user can issue a series of commands without having to constantly repeat the voice controlled device's appliances <name>. However, the user is permitted to say the <name> at the start of a command. Note that in this syntax, the <silence> is required to properly recognize the spoken <name> or <command>.

When either of the first or second alternate syntaxes is used, it is desirable to ensure that if a new user starts working with the voice controlled device, they are properly identified. This can be ensured by explicitly requiring the <name> after a period of inactivity or after power-up of the voice controlled device or other similar protocol.

Standard Core VUI Commands

There are a number of standard core commands included in the vocabulary 524 of voice controlled devices 102 operating using the standard VUI. FIGS. 6A–8 illustrate the syntax of the following commands.

Referring to FIG. 6A, at start 600, the appliance name, <name>, of a voice controlled device is usually spoken prior to a command. Any of the voice controlled device's appliances names can be spoken whenever the voice controlled device is listening for a command. If the <name> is not followed by a command within some period of time, the voice controlled device will go back to return to start 600 in its original idle state. This is indicated by the solid box Silence of N seconds. N in this case is a programmable value usually application dependent and assigned by the voice controlled device manufacturer. After supplying the appliance name, a user is granted access to further commands of the standard VUI operating on the voice controlled device at 601.

The syntax of the Help command is:

<name> Help <command (optional)> or

Help <command (optional)>

The help command can be invoked at any time, including when any other command can be given, or whenever the voice controlled device is waiting for a response. If the Help command is issued while the voice controlled device is waiting for a valid command, Help must be preceded with <name> if the voice controlled device requires a <name> before other commands. If the Help command is requested while the voice controlled device is waiting for any other type of response, <name> does not need to precede the Help command. In all cases where <name> is not required before Help, if the user says "<name> Help", the use of <name> does not generate an error.

The help function is context sensitive—whenever Help is requested, the voice controlled device responds with a description of the available options, given the current context of the voice controlled device. If Help is requested when the voice controlled device is listening for a command, the voice controlled device will respond with its state and the list the commands that it can respond to (e.g. "At Main menu. You can say . . . ") Further detail on any specific command can be obtained with the "Help <command>" syntax (e.g. "Help Dial", "Help Call", and even "Help Help"). If "Help" is requested while the voice controlled device is waiting for some type of non-command response (e.g. "Say the name"), then the voice controlled device will respond with a statement of the voice controlled device's current status, followed by a description of what it is waiting for (e.g. "Waiting for user response. Say the name of the person whose phonebook entry you wish to create, or say Nevermind to cancel.").

The syntax of the cancellation command is:

<name (optional)> Nevermind or

<name (optional)> Cancel

The Nevermind or Cancel command can be issued whenever the voice controlled device is executing a command and waiting for a response from the user. Nevermind or Cancel causes the voice controlled device to cancel the current command and respond with a statement that the operation has been cancelled (e.g. "Cancelled."). If Nevermind or Cancel is issued while the voice controlled device is waiting for a command, it can be ignored.

The use of <name> with Nevermind or Cancel is optional—it works identically whether or not <name> is spoken.

The syntax of the return to main menu command is:

<name> Main Menu

For voice controlled devices that have submenus of commands, <name> Main Menu returns the user to the main menu and causes a response of "At Main menu." or the like. This command provides an easy way for the user to return to a known point from any submenu. The Main Menu command does not have to be recognized in voice controlled devices that only have one menu, but is a mandatory command for voice controlled devices with submenus.

Changing Voice Controlled Device Names

Figure 6B:
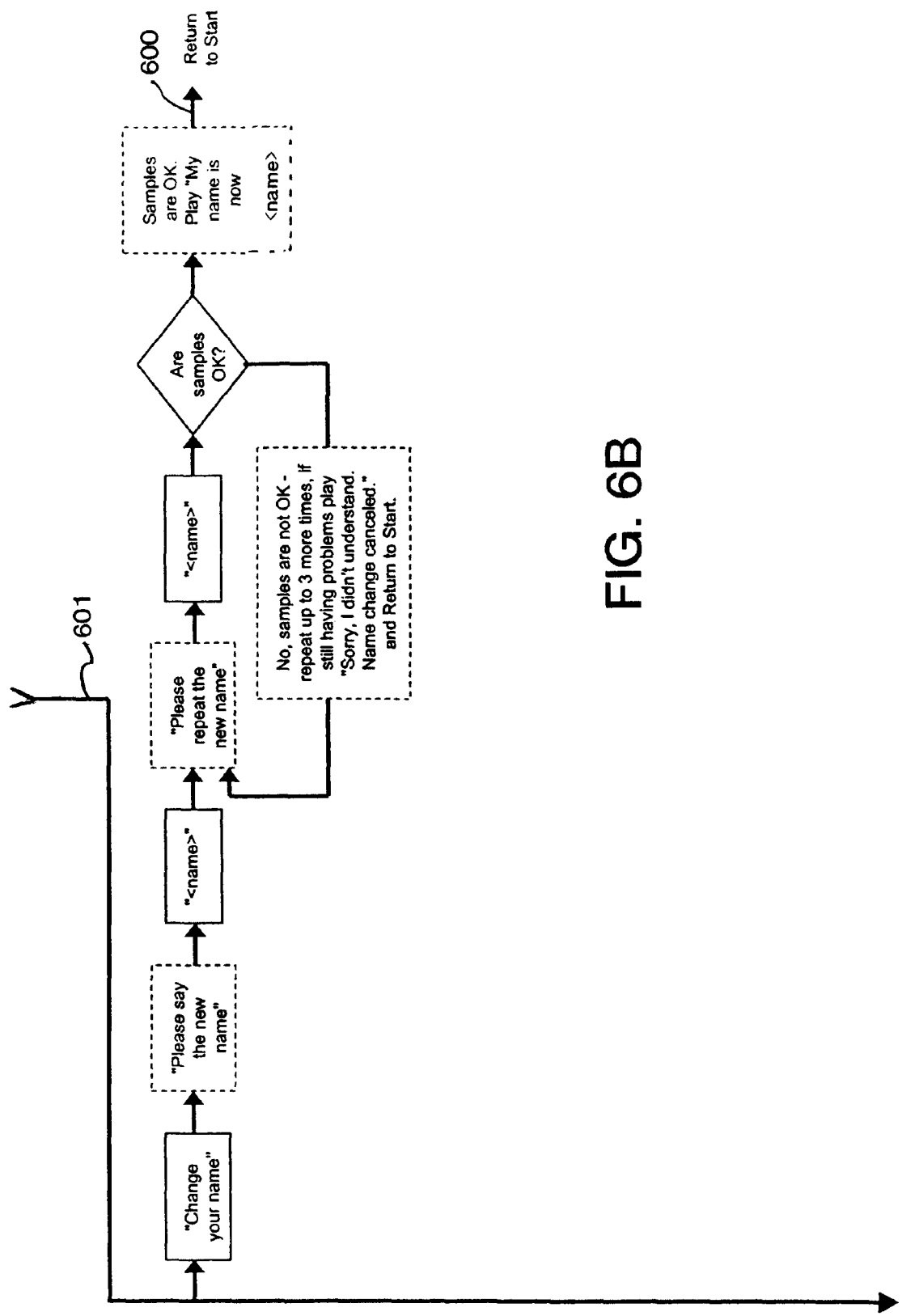

In some cases it may be desirable to change the user-assigned name of a voice controlled device. Referring now to FIGS. 6A–6B, the syntax of the Change Name command is:

<old name> Change Your Name

This command allows a user to name or rename a voice controlled device. When a voice controlled device is new, it has at least one default factory programmed appliance name (e.g. Telephone). Most voice controlled devices have the capability of supporting one or more user-assignable appliance names. A user can name the appliance name by saying "<factory programmed name> Change your name" (e.g. "Telephone change your name"). The voice controlled device will then ask for the new name to be repeated and then change its name. This process can be repeated once for each user-assignable name. For example, consider a 4-user telephone that can be assigned four user-assignable appliance names. A user may execute the four name changes with the commands: "Telephone change your name" followed by the dialog to set the name for user 1 to (for example) Aardvark. "Telephone change your name" followed by the dialog to set the name for user 2 to (for example) Barracuda. "Telephone change your name" followed by the dialog to set the name for user 3 to (for example) Coyote. "Telephone change your name" followed by the dialog to set the name for user 4 to (for example) Doggone. If the user attempted to change a fifth user-assignable name in sequence with the command ("Telephone change your name "), it would result in an error message because all available user-assignable appliance names were assigned. Note that the voice controlled device always responds to the factory programmed name, even if all user-assigned names are defined. Accordingly, in this example of a fifth attempt, the voice controlled device still recognizes the "Telephone" factory programmed name—it is just unable to assign a fifth new user-assignable appliance name.

An existing user-assignable appliance name can also be changed with the "Change Your Name" command. Continuing the above example, "Aardvark change your name" would alter the appliance's name for the first user (for example, it could be changed to Platypus), and leave the other three user names unchanged. Similarly, "Platypus change your name" followed by a dialog to set the name to "Telephone" would reset the first user name to the factory-programmed default.

Identification of Voice Controlled Devices

As voice controlled devices proliferate, it is important that users be capable of readily identifying what, if any, voice controlled devices are present when they enter a new environment. For example, a user walks into a hotel room that has a number of devices. In order to use them a user needs to know which devices are voice controlled devices. Additionally a user needs to know the appliance names in order to properly control them. Beside being audibly identified, voice controlled devices can be identified visually as well as by using a logo signifying a voice controlled device utilizing the standard VUI.

Figure 6C:
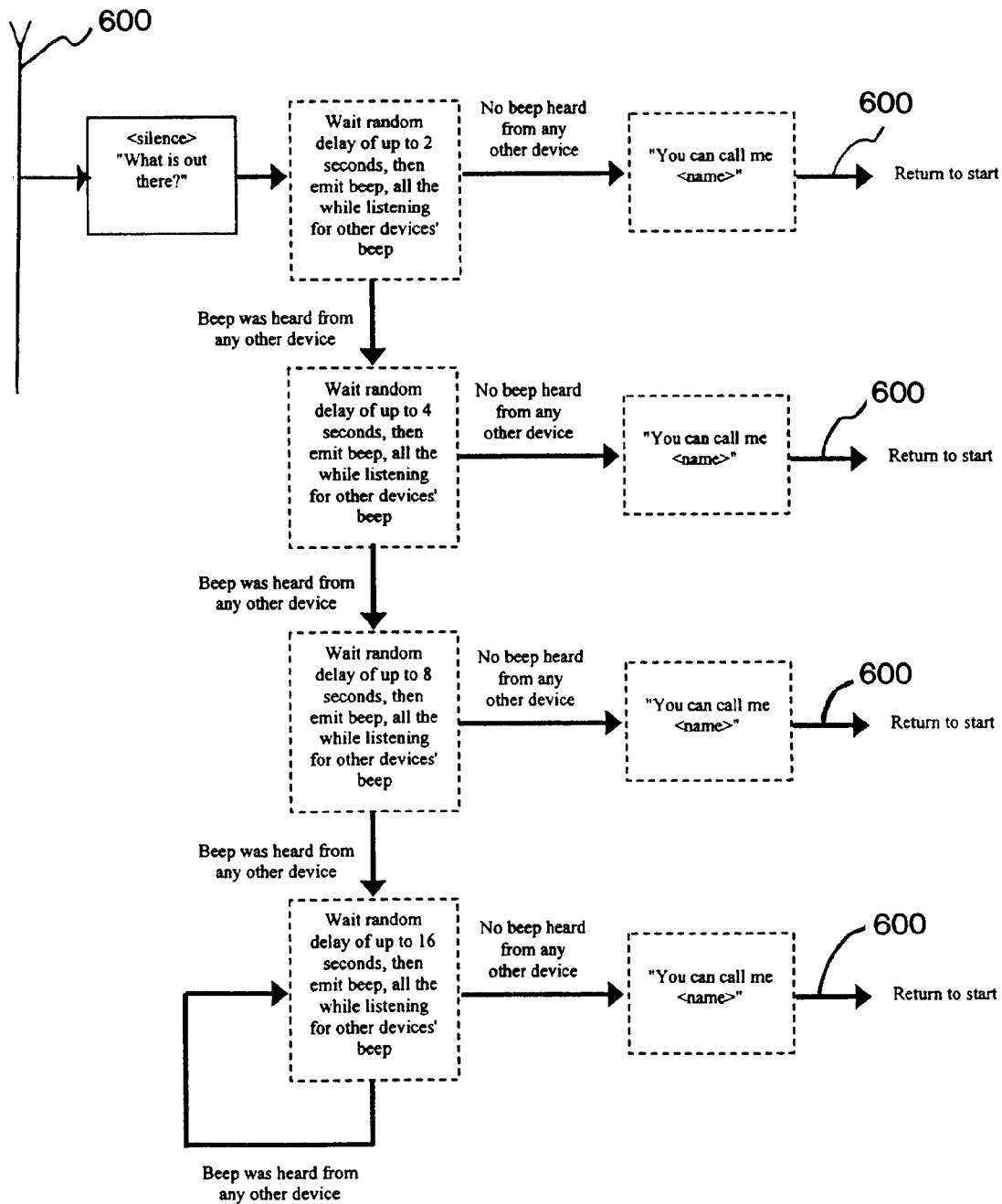
Figure 6D:
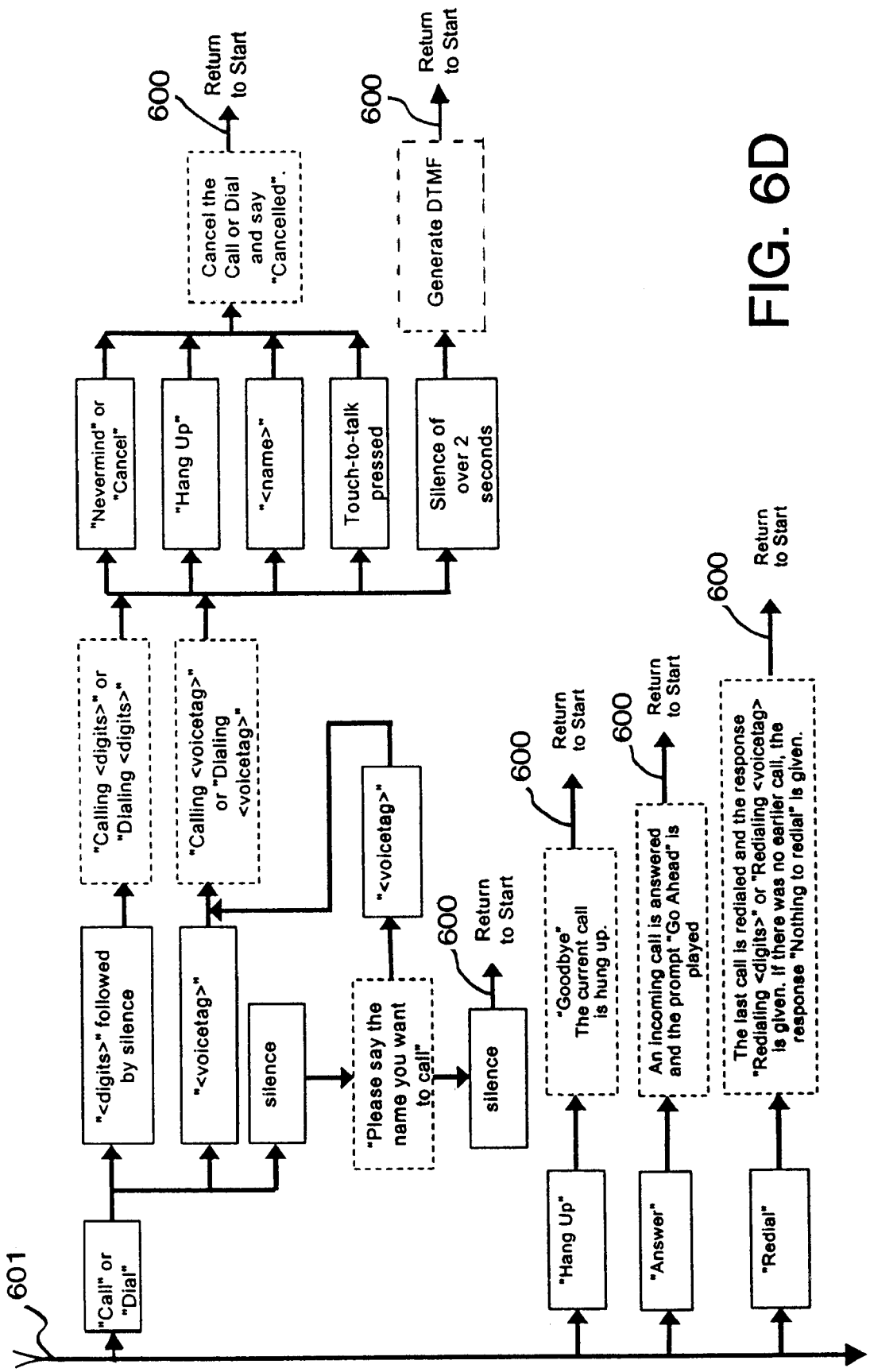
FIGS. 6D–6E are flow charts of the telephone command structure for the standard voice user interface of the present invention.
Figure 6E:
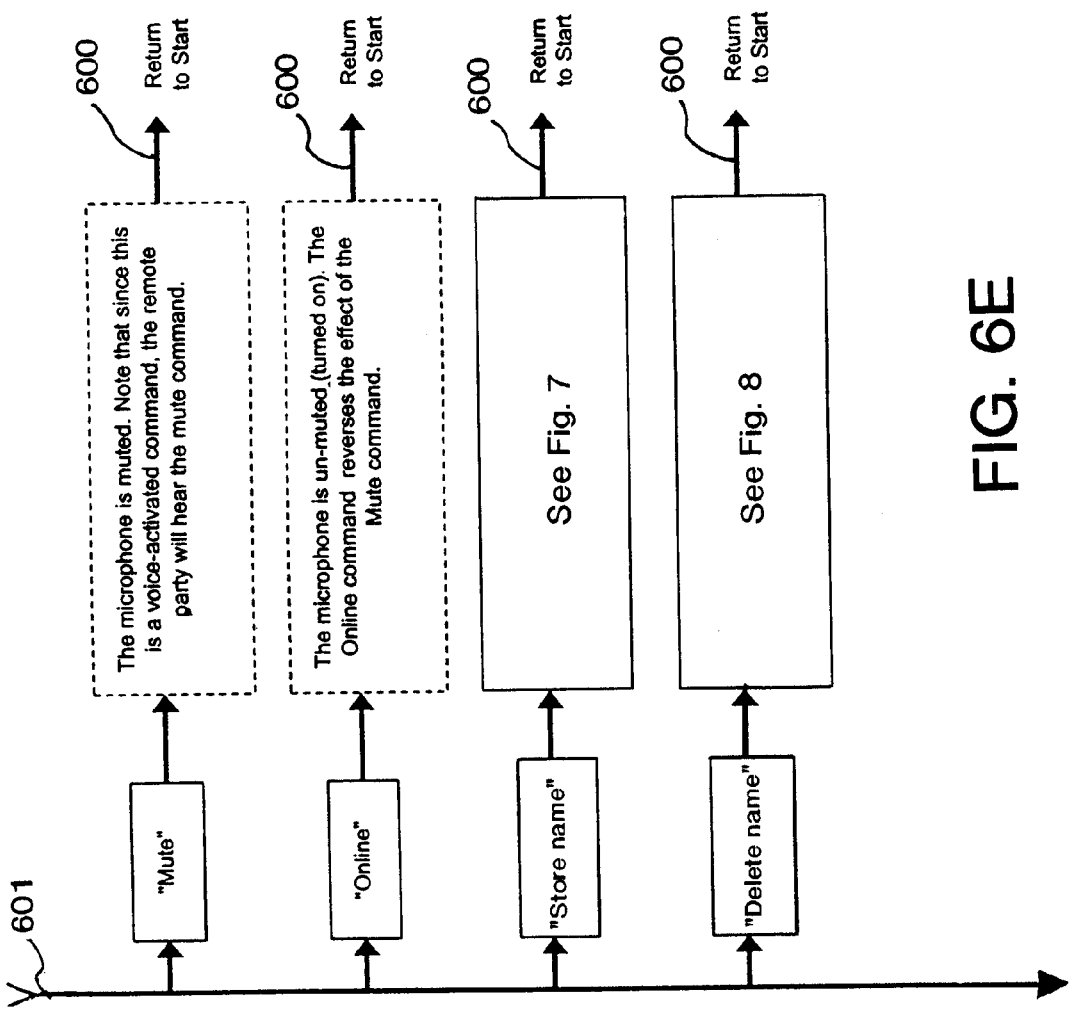
Figure 7:
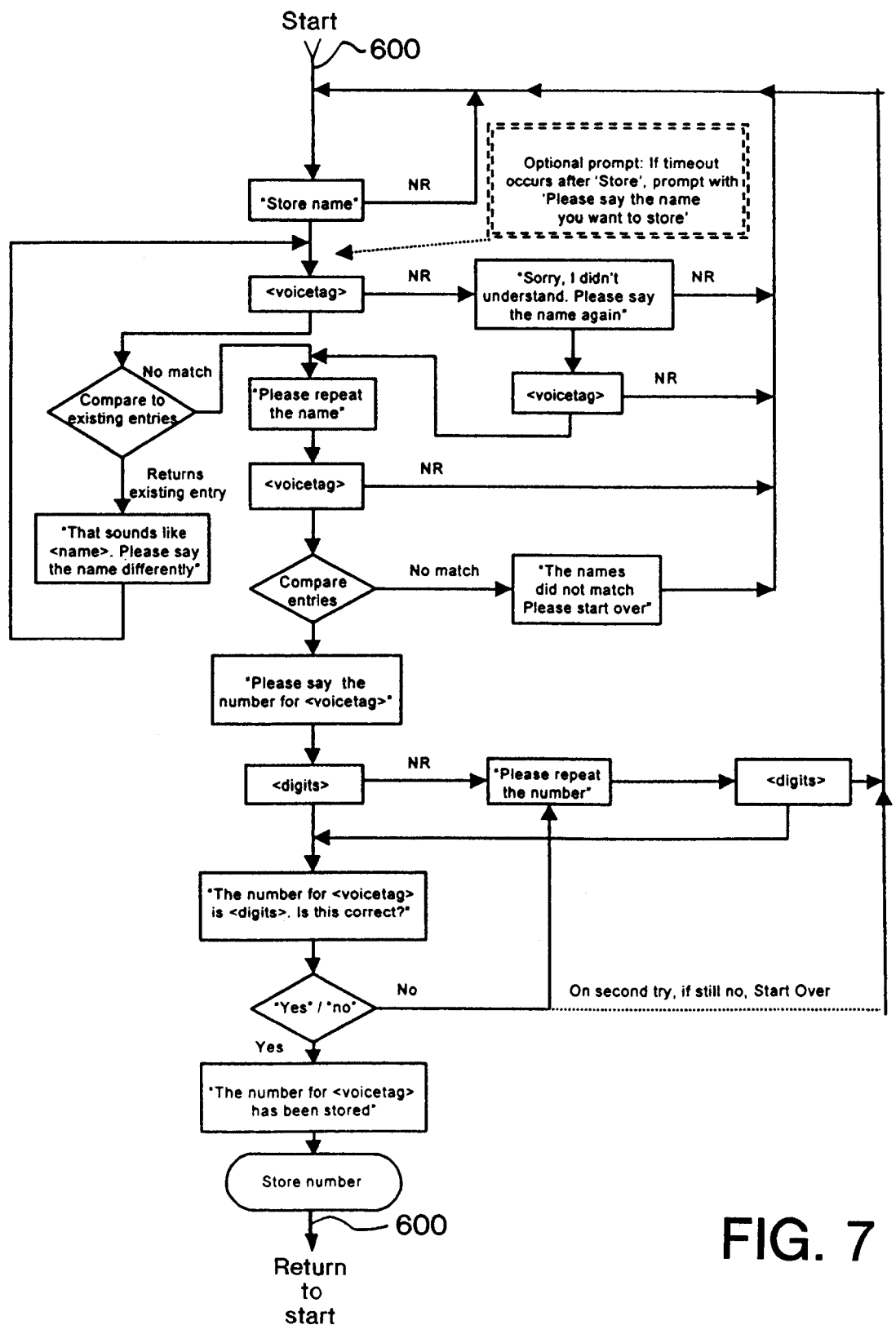
FIG. 7 is a flow chart of the "Store Name" telephone command structure for the standard voice user interface of the present invention.
Figure 8:
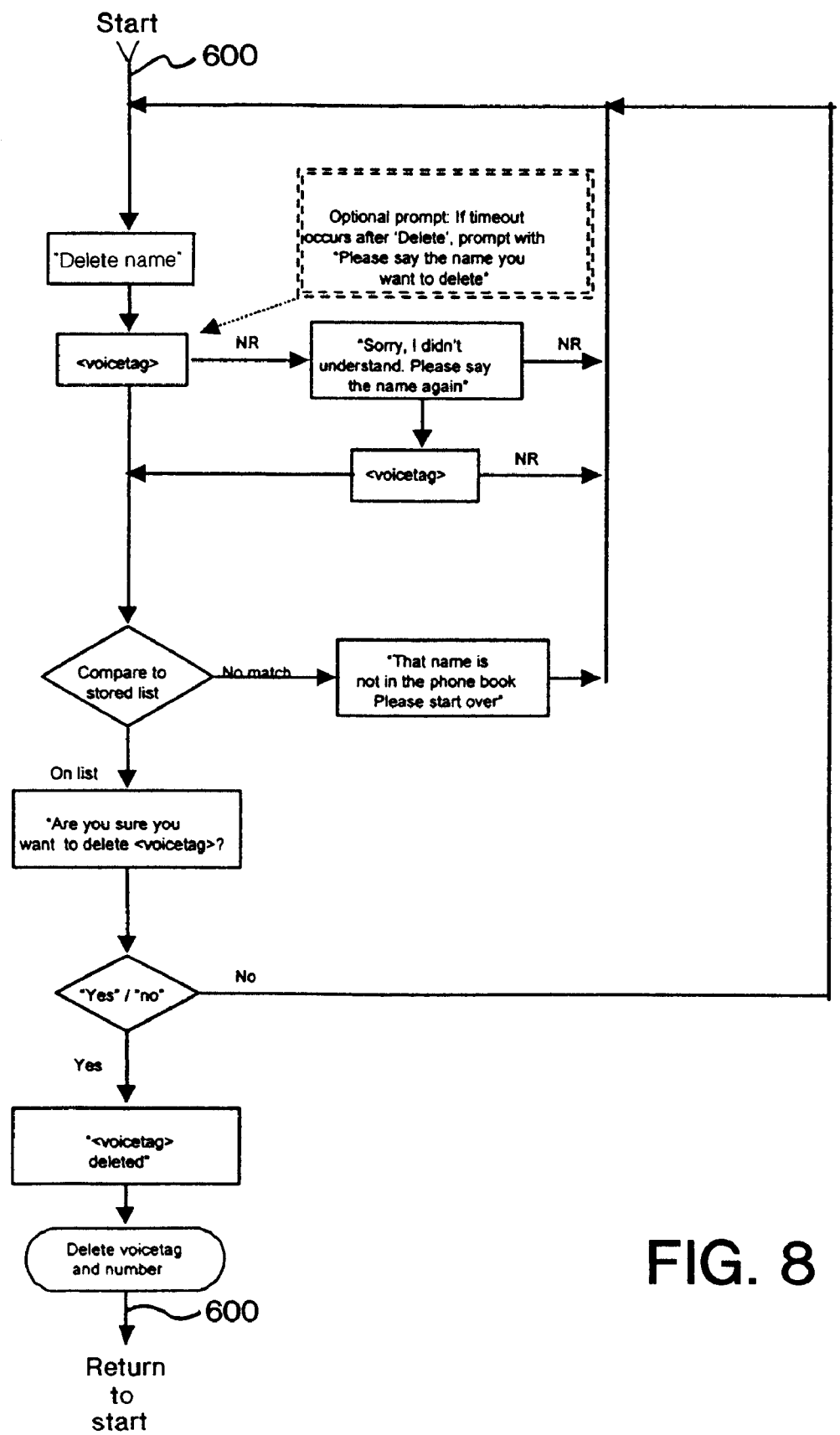
FIG. 8 is a flow chart of the "Delete Name" telephone command structure for the standard voice user interface of the present invention.

Acoustic identification works when voice controlled devices are actively listening for recognizable commands. In most cases, this means the voice controlled device is constantly listening and attempting recognition. Typically, these voice controlled devices will be AC powered, since the power drain from continuous recognition will be unacceptable for most battery operated voice controlled devices. Referring to FIG. 6A and 6C, the acoustic identification is accomplished by a user communicating an identification phrase to command the voice controlled device. The identification phrase "What Is Out There?" or some other suitable identification phrase may be used for causing the voice controlled devices to identify themselves.

The syntax of the standard VUI Identification phrase is:

<silence> What Is Out There?

In response to this query, any voice controlled device that hears the question must respond. The typical voice controlled devices response is a random delay of up to 2 seconds of relative silence, followed by a beep (the standard signal) and the response "You can call me <name>", where <name> is the factory-programmed name that can be used to address the voice controlled device. In the telephony voice controlled device example described above, a response might be "<beep> You can call me Telephone."

Referring to FIG. 6C, during the random delay of up to 2 seconds, each responding voice controlled device listens for another voice controlled device's response (specifically, for another voice controlled device's beep). In the event another voice controlled device starts responding (as evidenced by a beep) during this silence period, the listening voice controlled device must restart its silence timing after the responding voice controlled device finishes. In the event two voice controlled devices start responding at the same time (overlapping beeps), they both must back off for a new randomly selected silence delay. However, this time the random delay may be greater than the first, up to twice the length of the previous silence delay. In any event, the delay should not exceed 16 seconds. Additional back off periods for further conflict resolution is provided if other voice controlled devices respond.

Referring to FIG. 6A, the syntax of the Request User-Assignable Names command is:

<name> Tell Me Your Name or
<name> Tell Me Your Names

If security permits, any user-programmed <name> or the default <name> can be used. The Request User-Assignable Names command is used to ask a voice controlled device to list all the user-programmed <names> that it will respond to. If security permits, the voice controlled device communicates each user-programmed name in a list fashion. Between each user-assigned name it pauses for a moment. During this pause a user may communicate a command to the voice controlled device and it will be executed as if given with that user-programmed <name>. For example consider the telephony voice controlled device example above. The command "Telephone Tell Me Your Name" provided after a pause will cause the telephone to respond by saying "I have been named Aardvark, (pause) Barracuda (pause), Coyote (pause), and Doggone (pause)." During the pause that followed the voice controlled device saying "Coyote", a user may say "Call Mom", in which case the phone calls user Coyote's Mom (assuming that a phone number for Mom had been previously stored by user Coyote).

Security Considerations

The command for Requesting User Assignable names raises the issue of security in the voice controlled devices. In some cases it is necessary to limit access to a voice controlled device to authorized users. Various methods of security protection can be employed in a voice controlled device which are supported by the standard VUI.

The simplest and least secure security protection is provided through the VUI's naming capability. In this case every user is required to choose a unique name for a voice controlled device. The user assigned appliance names are kept confidential within the voice controlled device and only changed or deleted by a user. In this manner the appliance name can be used to provide basic security. However, there are many shortcomings with this approach. First, the user must typically repeat the name before issuing each command, which makes it easy for someone to overhear the name, resulting in a loss of security. Second, most voice controlled devices will include a capability for deleting or changing a user's name for the device. It is preferable to make deletions and changes easy to perform. Additionally changes may need to be performed by someone other than that particular user. For example, the user may have forgotten the name he originally assigned to the voice controlled device, or the user may have stopped using the device and not be available to delete his settings. In the case of using the appliance name as security, there is an inherent conflict between the need for ease of use in changing a name and the quality of security.

A greater level of security can be achieved by requiring the user to say a secret numeric sequence, password or phrase in order to gain access to the voice controlled device. The login might be required when the user starts using the voice controlled device after some period of inactivity, or based on some other criteria. A disadvantage of this approach is that the spoken numeric sequence or phrase might be overhead. Another security alternative is to require the user to enter the numeric sequence, password, or phrase on a keypad such as optional keypad 311. Although this introduces additional hardware, it eliminates the risk of a secret code being overheard by another. A variety of other security options are also possible, including use of a physical key or a security card (e.g. magnetic stripe or smartcard).

Additional security is provided by automatic cancellation or termination of user access to the voice controlled device. In some cases access may be automatically cancelled after every command execution. In other cases automatic cancellation of access may occur following some period of inactivity, power-down or reset, completion of some operation (e.g. in a phone, at the end of a call), or upon the specific request of a user by use of a "Cancel Access" command.

Application-specific Commands

The standard VUI provides each voice controlled device with a number of application specific commands. The application specific commands provided by the standard VUI are associated with telephone and answering machine applications. Additional application specific commands can be programmed for and included in the vocabulary by a manufacturer.

General guidelines for developing commands for the standard VUI are as follows. Sub-menus should be limited in number and organized around logical groups of commands. For example, a telephone TAD might have a main menu that included telephony functions, a submenu for phonebook management, and another submenu for TAD functions.

The number of commands in any menu or submenu should generally be limited to ten or less to minimize complexity. The help function should clearly describe the available commands.

Complex commands should be broken down into manageably small units. Command phrases should be selected that ensure high recognition success. The standard VUI commands have been selected to ensure high recognition accuracy. Care should be exercised when creating a custom vocabulary to avoid using confusable phrases.

For destructive events (delete, etc.), user-confirmation of the correct entry and verification of the operation should be requested.

Telephony Vocabulary

Referring now to FIGS. 6D–6E, 7, and 8, flow charts for the telephony vocabulary for the standard VUI are illustrated. The telephony vocabulary is particularly for telephony voice controlled devices such as desktop telephones, cellular telephones, cellular telephone car kits, and cordless phones. The SRS 204 of the present invention is capable of recognizing the commands in the telephony vocabulary and converting them into recognized tokens for control of the telephony voice controlled devices. The telephony vocabulary includes all the standard VUI Core Commands and the following application specific commands.

The syntax of the Call command is:

<name> Call <voicetag> or

<name> Call <digits>

The Call command is used to dial a specific phone number, expressed either as a series of digits or as a phonebook voicetag. The <digits> can be any list of numeric digits. The telephony voice controlled device allows for the synonyms "oh" for zero, and "hundred" for zero-zero to be enabled. The sequence of <digits> can contain embedded pauses. However, if a pause exceeds a programmable duration, the sequence is terminated and the command executed after recognition of a pause that exceeds a duration set by the system designer. The telephony voice controlled device response to a Call command should be "Calling <digits>" or "Calling <voicetag>" with the recognized digits or recognized voicetag voiced to verify accurate recognition. The "Cancel" command can be used to cancel the calling operation in the event of misrecognition.

The syntax of the Dial command is:

<name> Dial <voicetag> or

<name> Dial <digits>

The Dial command is the same as the Call command.

The syntax of the Answer command is:

<name> Answer

This command is used to answer an incoming call. The response prompt is "Go ahead".

The syntax of the Hangup command is:

<name> Hangup

This command is used to hangup an active call. The response prompt is a high-pitched beep.

The syntax of the Redial command is:

<name> Redial

This command is used to redial a number. The response is "Redialing <digits>" or "Redialing <voicetag>", depending on whether the previous Call or Dial command was to <digits> or a <voicetag>. If there was no earlier call made, the response is "Nothing to redial".

The syntax of the Store command is:

<name> Store

The Store command is in the phonebook submenu and is used to add a new voicetag.

The syntax of the Delete command is:

<name> Delete

The Delete command is in the phonebook submenu and is used to delete a voicetag.

The syntax of the Mute command is:

<name> Mute

This command mutes the microphone. The response by the voice controlled device is "Muted".

The syntax of the Online command is:

<name> Online

This command unmutes the microphone. The response is "Online".

Prompts can be communicated by the voice controlled devices to request a response from the user. Prompts may be communicated (i.e. prompting) by a speech synthesizer, playback of pre-recorded speech or other means. The prompts in the telephone vocabulary include the following context-sensitive help prompts:

| | | |
|---|---|---|
| "Calling <digits> <voicetag>" | "Please say the name you want to call" | "Online" |
| "Dialing <digits> <voicetag>" | "Please start over" | "one" |
| "Go ahead" | "My name is now <name>" | "two" |
| "Goodbye" (for the hangup command) | "Redialing <digits> <voicetag>" | "three" |
| "Cancelled" | "Sorry, I didn't understand" | "four" |
| Please say the name you want to delete" | "Please say the name again" | "five" |
| Are you sure you want to delete <voicetag>?" | "Name change canceled" | "six" |
| <voicetag>deleted" | "The names did not match" | "seven" |
| Please say the new name" | "Please repeat the number" | "eight" |
| "Please repeat the new name" | "The number for <voicetag> is <digits>. Is this correct?" | "nine" |
| "Please say the number for <voicetag>" | "The number for <voicetag> has been stored" | "zero" |
| "That name is not in the phone book" | "Do you want to store it now?" | "hundred" |
| | "Muted" | "Nothing to redial" |
| | | "Star" |
| | | "Flash" |
| | | "Pound" |

In addition to these prompts, the voice controlled devices can generate a number of different tones or beeps. These include a medium pitch beep (e.g. 200 millisecond, 500 Hz. sine wave), a low pitched beep (e.g. a buzzer sound or 250 millisecond, low frequency beep signifying erroneous entry) and a high pitched beep (e.g. 200 milliseconds, 1200 Hz. sine wave). Other sounds are possible and would be within the intended scope of the present invention.

Vocabulary For Telephone Answering Voice Controlled Device

In addition to the forgoing, application specific commands for the standard VUI enable a user to interface to a telephone answering voice controlled device using voice commands. A user can manage message functions and obtain remote access from a telephone answering voice controlled device without using a keypad. The following lists the additional voice commands to be included in the vocabulary 524 for telephone answering voice controlled device.

| | | |
|---|---|---|
| <name> Play new | <name> Rewind <n> | <name> Stop |
| <name> Play all | <name> Record Greeting | <name> Play Greeting |
| <name> Delete this | <name> Record message | <name> Room monitor |
| <name> Delete all messages | <name> Answer On | <name> Password <password phrase> |
| <name> Forward <n> | <name> Answer Off | |

Automobile Control Vocabulary

Additional specific commands for the standard VUI enable a user to interface to automobile accessories using voice control. Two primary areas for automotive voice control include the control of interior accessories and control of entertainment systems. Automotive accessories include environmental controls, windows, door locks, and interior lights. It is preferable that "Mission critical" elements in an automobile, such as steering, braking, acceleration, and exterior lights not be controlled by voice due to potential safety concerns if misrecognition occurs. Entertainment controls are used primarily for a DC player/changer and for the radio.

The automobile control vocabulary 524 for voice controlled devices includes Air conditioning, Fan speed, Temperature, Driver window, Passenger window, Left rear window, Right rear window, Windows, Door locks, Wipers, Low, Medium, High, Increase, Decrease, Set, Reset, Cancel, Clear, Recall, On, Off, Colder, and Warmer.

Standard User Interface Functions For The API

Figure 9A:
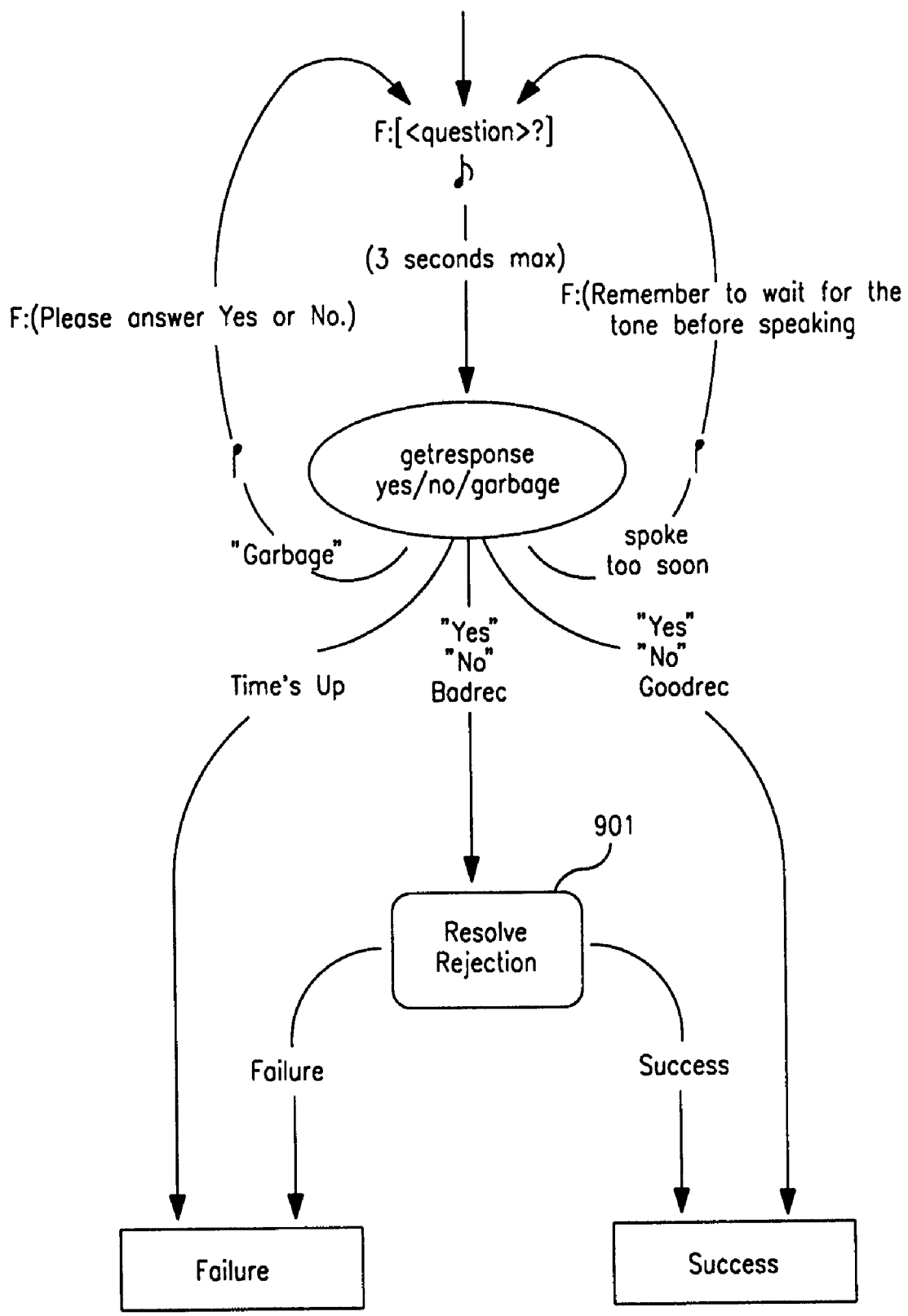
FIGS. 9A–9B are flow charts of the "GETYESNO" function for the standard voice user interface of the present invention.
Figure 9B:
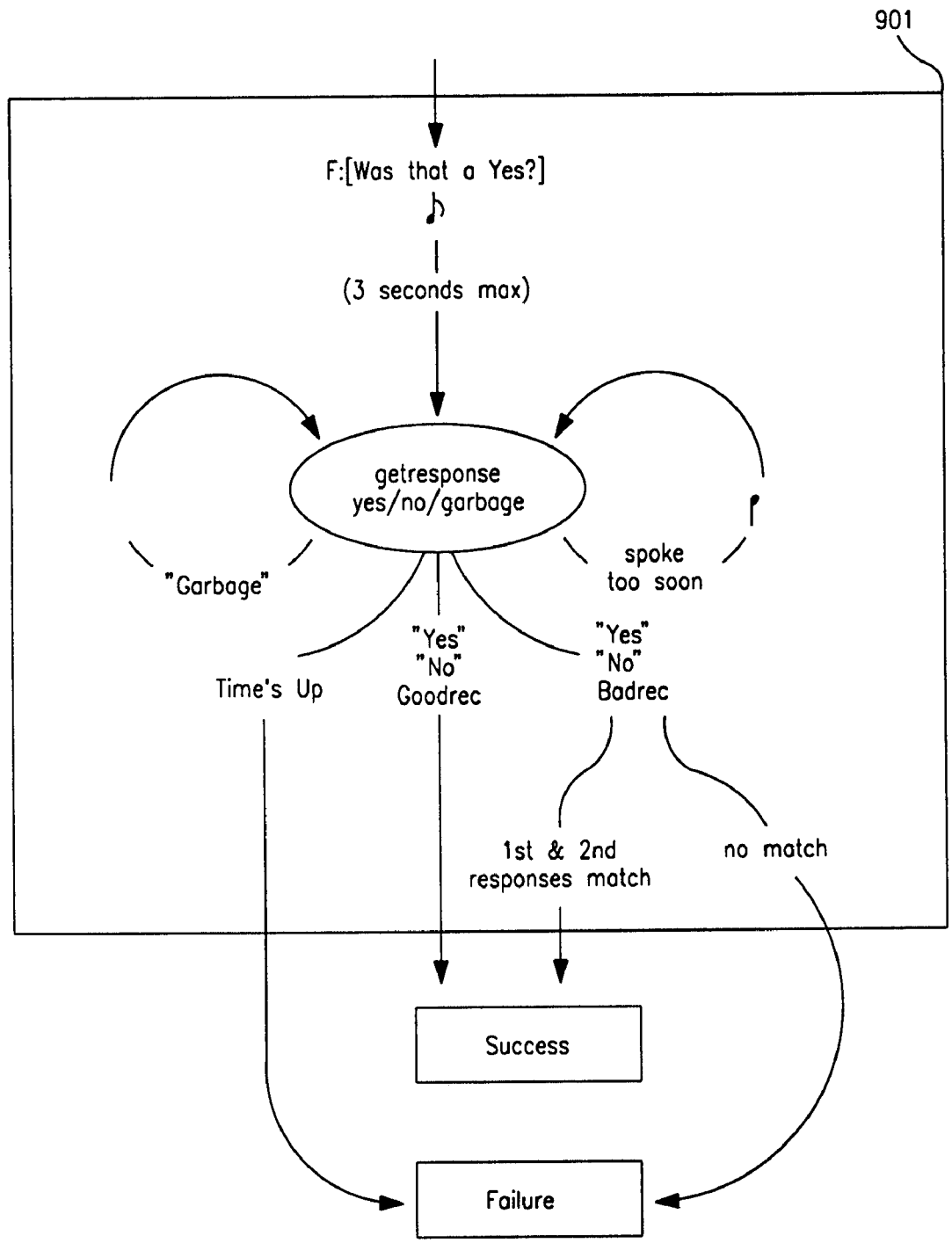
Figure 10A:
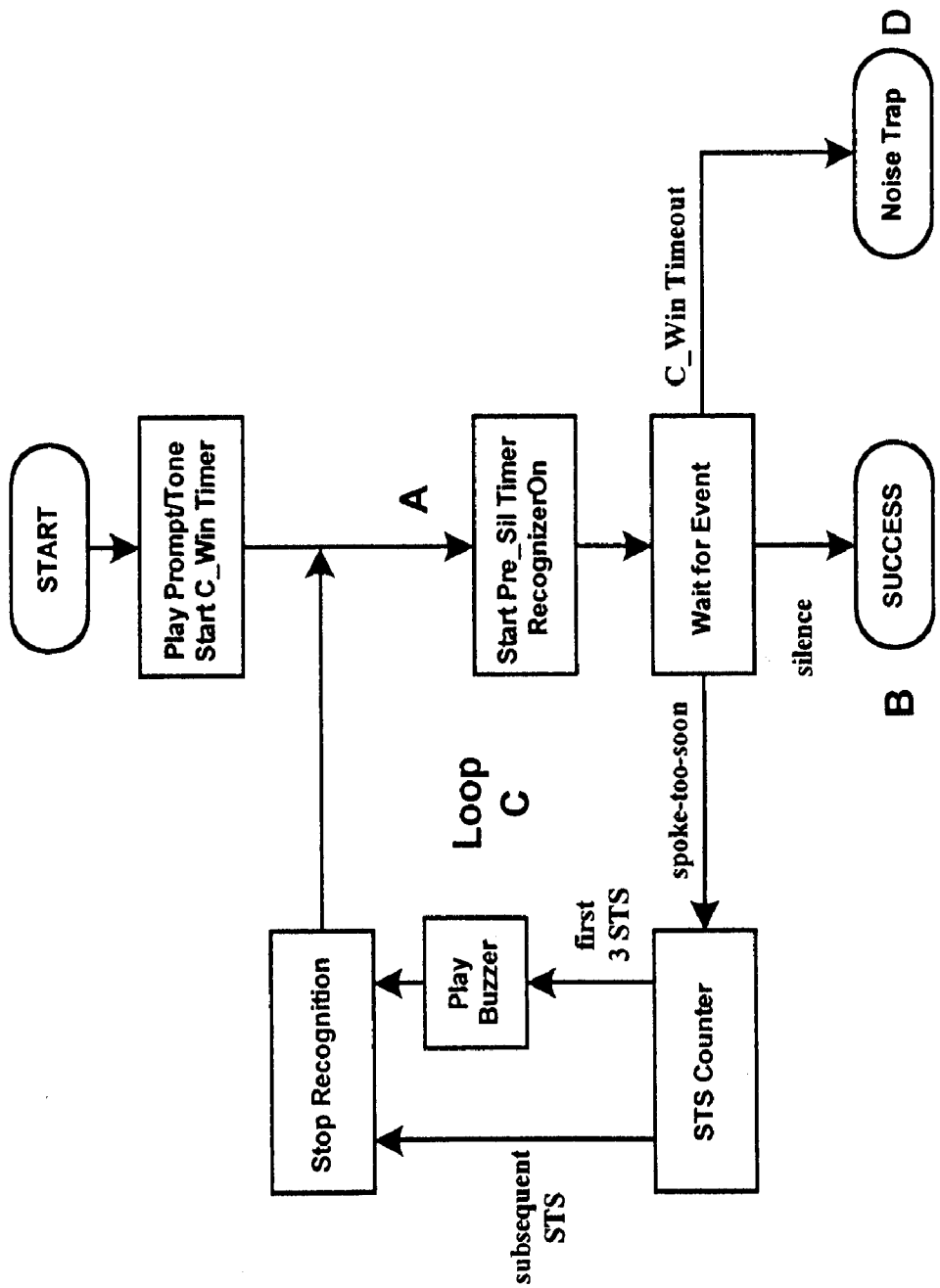
FIGS. 10A–10C are flow charts of the "GETRESPONSE" function for the standard voice user interface of the present invention.
Figure 10B:
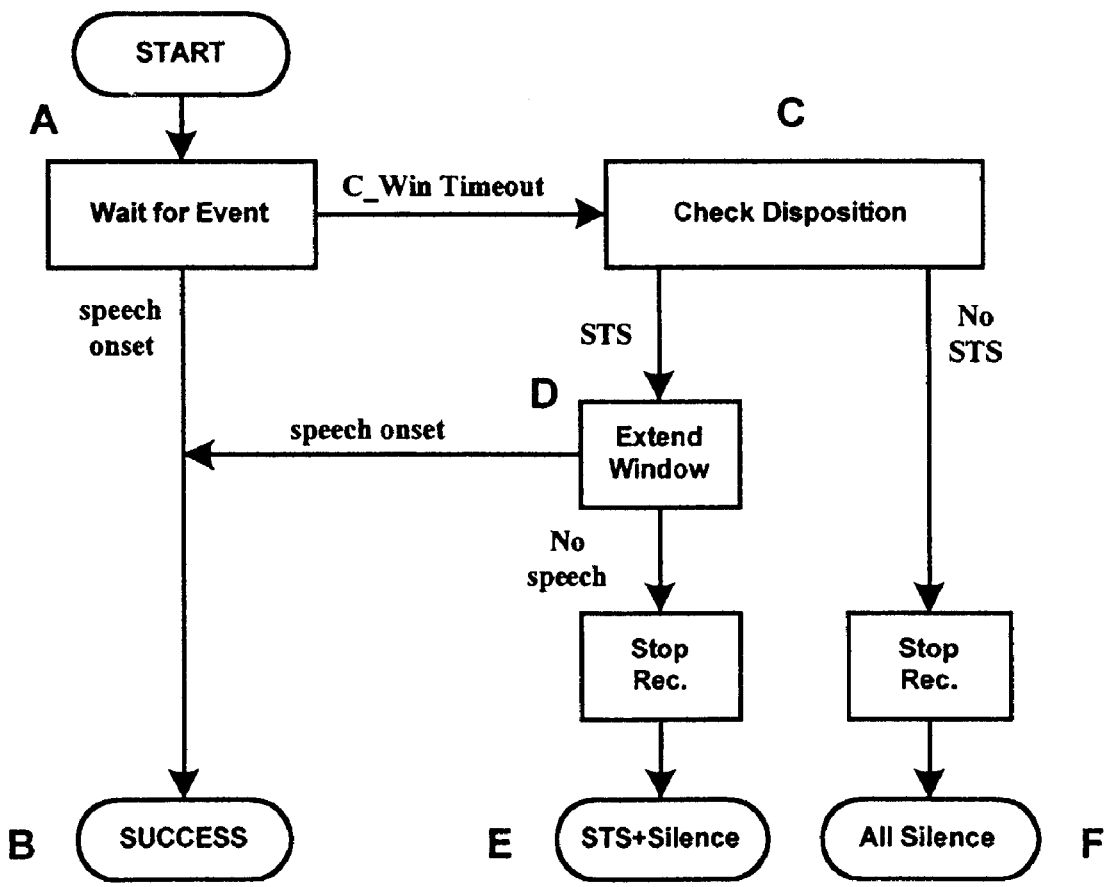
Figure 10C:
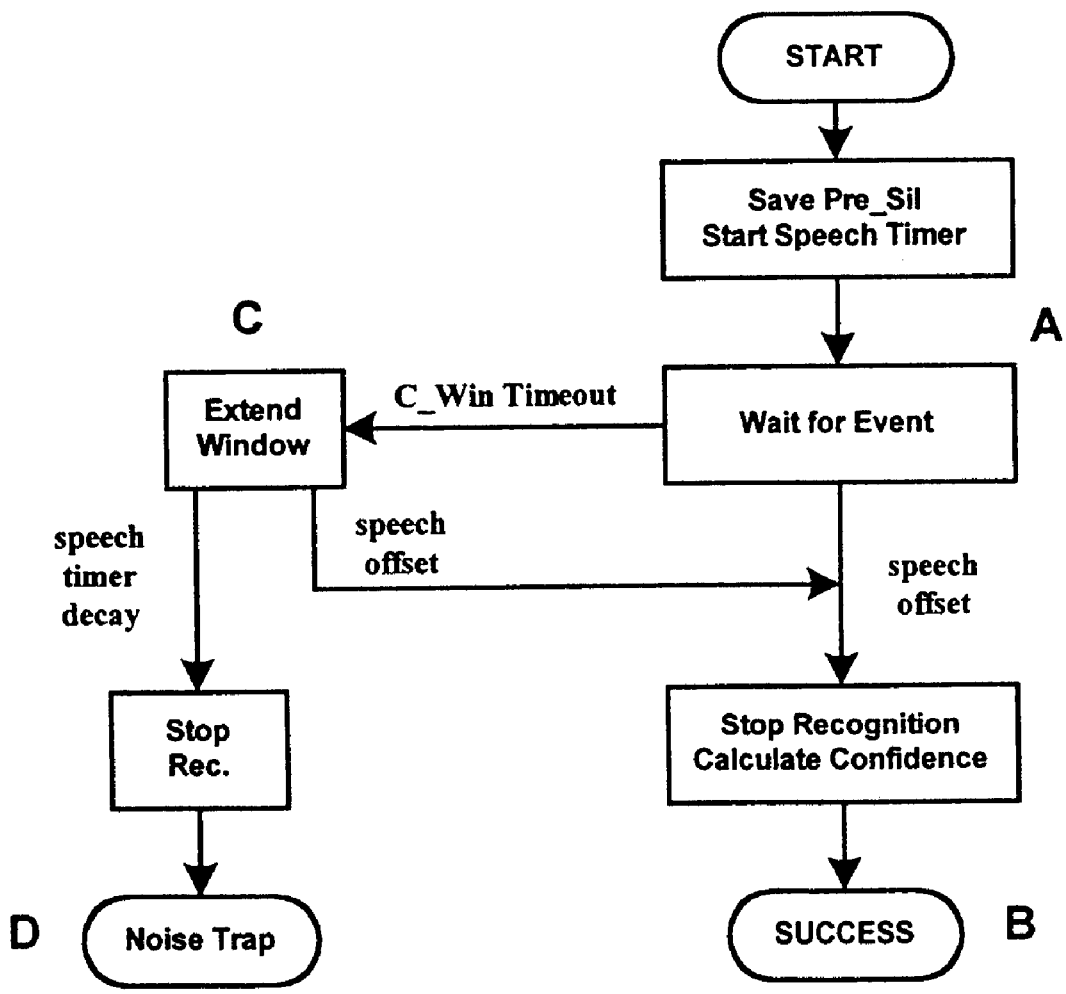
Figure 11:
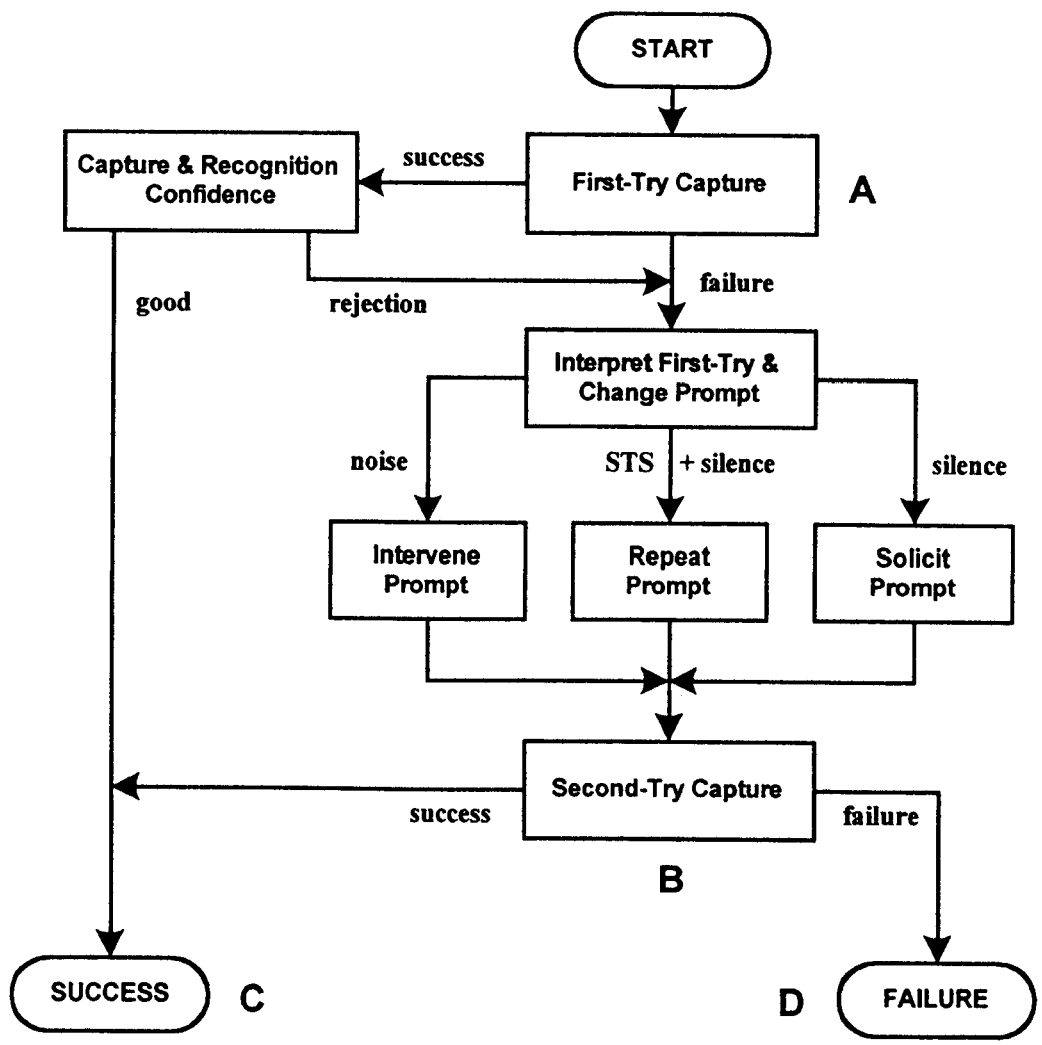
FIG. 11 is a flow chart of the "GETRESPONSEPLUS" function for the standard voice user interface of the present invention.
Figure 12:
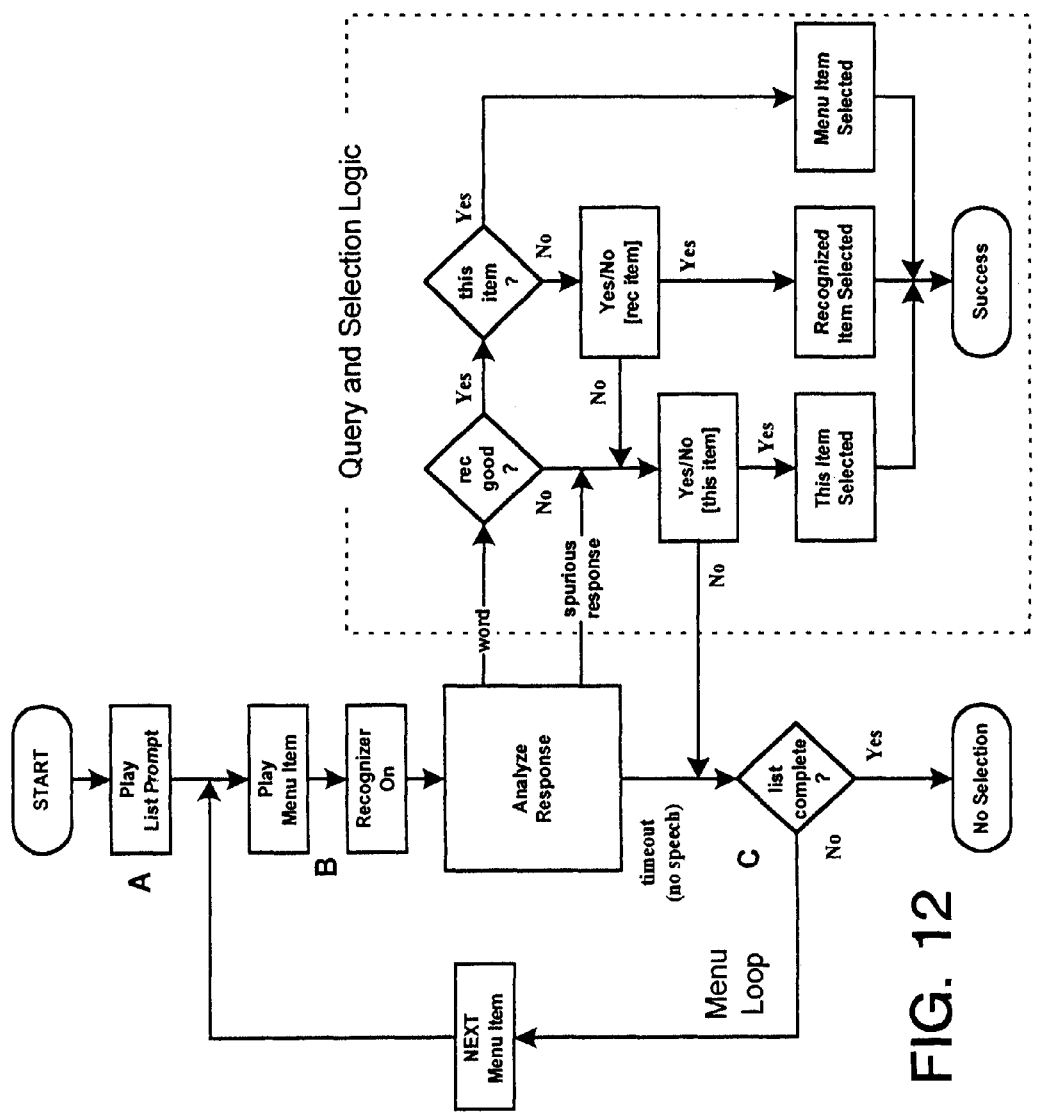
FIG. 12 is a flow chart of the "LISTANDSELECT" function for the standard voice user interface of the present invention.

The standard VUI of the present invention includes standard functions for user interactions, which are accessed by an applications programming interface (API). These standard functions for the API include GETYESNO, GETRESPONSE, GETRESPONSEPLUS, and LISTANDSELECT which are used by custom software developers to develop applications that operate on top of the standard VUI of the present invention. FIGS. 9A–9B, 10A–10C, 11, and 12 are flow charts illustrating the functionality of these standard user interface functions within the standard VUI. Briefly, the GETYESNO function is for prompting and accepting a positive (Yes) or negative (No) response from a user. The GETRESPONSE function is for prompting and accepting an input from a user that corresponds to an expected list of responses. The GETRESPONSEPLUS function is for prompting and accepting input from a user similar to the GETRESPONSE function but includes enhanced error recovery features. The LISTANDSELECT function provides a user with a list of choices and allows the user to select one. The operation of the GETYESNO, GETRESPONSE, GETRESPONSEPLUS, and LISTANDSELECT are adapted from "Debouncing the Speech Button: A Sliding Capture Window Device for Synchronizing Turn-Taking" by Bruce E. Balentine et al, International Journal of Speech Technology, 1997. FIG. 9A illustrates the use of a Yes/No menu and FIG. 9B illustrates how to resolve a rejection or a bad recognition. FIG. 10A illustrates the initiation or begin window for the GETRESPONSE and GETRESPONSEPLUS functions. FIG. 10B illustrates the speech startup or open window functionality for the GETRESPONSE and GETRESPONSEPLUS functions. FIG. 10C illustrates the end recognition or close window functionality for the GETRESPONSE and GETRESPONSEPLUS functions. FIG. 11 illustrates the dual capture window functionality for the GETRESPONSEPLUS function. FIG. 12 illustrates the menu list functionality for the LISTANDSELECT function.

Referring to FIGS. 9A–9B, the GETYESNO user interface function is used to ask the user a question and to accept a positive or negative response such as "Yes" or "No" (or the equivalent phrases in other languages). The parameters associated with the GETYESNO are the QUESTION and a TIMEOUT period. The question parameter is a voice prompt to the user which asks a question that can be answered positively or negatively such as "yes" or "no" The TimeOut parameter is the number of seconds to wait for a response before flagging that a response was not detected. The voice controlled device returns a byte value depending upon the response or outcome. A 0 is returned if "No" response is detected. A 1 is returned if a "Yes" response was detected. A 17 is returned if a response was not detected in the allowed time indicating a TimeOut error. An 18 is returned if a response was detected, but it was not recognizable indicating an out-of-vocabulary-word error.

Referring to FIGS. 10A–10C, GETRESPONSE user interface function plays a Prompt to a user that solicits a response and waits for the response. GETRESPONSE looks for a spoken response that matches a topic within a list known as TopicList. GETRESPONSE either returns an array of recognized tokens, or an error indicator. The parameters associated with the GETRESPONSE are Prompt, TimeOut, STS_Sound, and TopicList. The Prompt parameter is the initial prompt to be played to the user. The TimeOut parameter is the number of milliseconds to wait for a response before flagging that a response was not detected. The STS_Sound parameter (Spoke-Too-Soon Sound) is the sound or prompt to be played if a user speaks before the Prompt finishes playing. Typically, the STS_Sound will be a short tone or beep sound rather than a spoken phrase. The parameter TopicList is the vocabulary subset for the list of topics which the SRS 204 should use to identify the spoken response. The voice controlled device returns a pointer to an integer array. If the recognition of a response associated with the TopicList was successful, the first element in the array is the number of tokens returned and the following elements in the array are the tokens for each identified speech element (one or more words). Element 1 is n the Number of tokens returned. Elements 2 through n+1 are the Token values for each speech element recognized. For example, consider the phrase "Telephone Dial Office". If the token value for the speech element "Telephone" is 7, for the speech element "Dial" is 12, and for the speech element "Office" is 103, then if they are all recognized successfully, the complete array returned would be four elements long with the values 3, 7, 12, 103. If the recognition of the response was not successful, the array is two elements long. The first element is set to zero and the second element indicates the type of error that occurred. In this case, Element 1 is set to 0 indicating that an error was detected. Element 2 is set to 17 indicating that a response was not detected in the allowed time (TimeOut error) or 18 indicating that a response was detected, but it was not recognizable (out-of-vocabulary-word error). The array returned for a timeout error is two elements long with values 0, 17 and the array returned for an out-of-vocabulary-word error is two elements long with values 0, 18.

Referring to FIG. 11, GETRESPONSEPLUS user interface function plays a Prompt to a user that solicits a response and waits for the response. GETRESPONSEPLUS is similar to GETRESPONSE in that it plays a Prompt for the user and then waits for a spoken response. However, GETRESPONSEPLUS includes the capability to play prompts to recover from error situations where the user has not spoken or has excessive noise in the background. GETRESPONSEPLUS listens for a spoken response that matches the topics in TopicList. GETRESPONSEPLUS either returns an array of recognized tokens, or an error indicator. The parameters for GETRESPONSEPLUS are $Initial_{13}$ Prompt, Timeout, STS_Sound, TopicList, MaxTries, $Intervene_{13}$ Prompt, $Repeat_{13}$ Prompt, and the Help Prompt. The $Initial_{13}$ Prompt parameter is the initial prompt to be played to a user to solicit a response. The TimeOut parameter is the number of milliseconds to wait for a response before flagging that a response was not detected. The STS_Sound prompt is a sound or prompt to be played if user speaks before Prompt finishes playing. Typically, STS_Sound prompt will be a short tone or beep sound rather than a spoken phrase. The parameter TopicList is the vocabulary subset for the list of topics which the SRS 204 should use to identify the spoken response. The MaxTries parameter is the maximum number of times GETRESPONSEPLUS will re-prompt the user in an effort to get a good recognition. If recognition does not occur after MaxTries, GETRESPONSEPLUS will return and indicate an error. The Intervene$_{13}$ Prompt parameter is a prompt played to ask the user to repeat himself (e.g. "There was too much noise. Please repeat what you said."). This prompt is played when there was too much noise during the previous recognition attempt. The Repeat$_{13}$ Prompt parameter is the prompt played to ask the user to repeat what was just said (e.g. "Please repeat what you said"). This prompt is used when a spoke-too-soon error occurred. The Help$_{13}$ Prompt parameter is the prompt played when the user seems to need further instructions, including when the user says nothing. The voice controlled device returns a pointer to an integer array upon completion of the user interface function. If the recognition of a response associated with the TopicList was successful, the first element in the array is the number of tokens returned and the following elements in the array are the tokens for each identified speech element (one or more words). Element 1 is n the Number of tokens returned. Elements 2 through n+1 are the Token values for each speech element recognized. For example, consider the phrase "Telephone Dial Office". If the token value for the speech element "Telephone" is 7, for the speech element "Dial" is 12, and for the speech element "Office" is 103, then if they are all recognized successfully, the complete array returned would be four elements long with the values 3, 7, 12, 103. If recognition was not successful, the array is four elements long. The first element is zero. The second element indicates the most recent type of error that occurred. The third through fifth elements indicate the number of times each type of error occurred between when GETRESPONSEPLUS was called to when GETRESPONSEPLUS returned. In this case Element 1 has a value of 0 indicating that an error was detected. Element 2 has a value of 17 indicating that a response was not detected in the allowed time (TimeOut error) or 18 indicating that a response was detected, but it was not recognizable (out-of-vocabulary-word error) or 19 indicating that a spoke-to-soon error was detected. Element 3 has a value of x indicating the number of times a TimeOut error was detected. Element 4 has a value of y indicating the number of times an out-of-vocabulary-word error was detected. Element 5 has a value of z indicating the number of times a spoke-too-soon error was detected.

Referring to FIG. 12, LISTANDSELECT user interface function first plays a Prompt. Then it plays each prompt in array ListOfMenuPrompts, pausing after each for a PauseTime. During these pauses, the recognizer listens for a spoken response that matches the topics in TopicList. LISTANDSELECT either returns an array of recognized tokens, or an error indicator. The parameters for LISTANDSELECT include Initial$_{13}$ Prompt, Timeout, STS_Sound, TopicList, ListOfMenuPrompts, PauseTime, and the Help_Prompt. The Initial$_{13}$ Prompt parameter is the initial prompt to be played to the user. The TimeOut parameter is the number of milliseconds to wait for a response, after playing all the prompts in ListOfMenuPrompts, or before flagging that a response was not detected. The STS_Sound parameter is the sound or prompt to be played if user speaks before a prompt finishes playing. Typically, STS_Sound will be a short tone or beep sound rather than a spoken phrase. The parameter TopicList is the vocabulary subset for the list of topics which the SRS 204 should use to identify the spoken response. The ListOfMenuPrompts parameter is an array of prompts which will be played one at a time. The first element in the array is a count of the number of prompts in ListOfMenuPrompts. The PauseTime parameter is the time to pause after playing each prompt in ListOfMenuPrompts. The PauseTime parameter has a value in milliseconds. The Help_Prompt parameter is the prompt played when the user seems to need further instructions, including when the user says nothing. The voice controlled device returns a pointer to an integer array upon completion of the user interface function. If recognition was successful, the first element in the array is the number of tokens returned, and the following elements in the array are the tokens for each identified speech element (one or more words). Element 1 has a value of n indicating the number of tokens returned. Elements 2 through n+1 have a value of x indicating the token values for each speech element recognized. If recognition was not successful, the array is two elements long. The first element is zero. The second element indicates the type of error that occurred. In this case, Element 1 has a value of 0 indicating that an error was detected. Element 2 has a value of 17 indicating a response was not detected in the allowed time (TimeOut error) or 18 indicating that a response was detected, but it was not recognizable (out-of-vocabulary-word error).

The ACOUSTICADDWORD function is used by application software to allow a user to add a phrase, also called a voicetag, into the voice controlled device. These phrases can later be recognized using the GETRESPONSE and GETRESPONSEPLUS functions. The ACOUSTICADDWORD function can be used, for example, in a telephone to create dial-by-name entries. By storing a person's name ("John Smith") or identity ("Mother") or other distinguishing phrase ("My office number") with ACOUSTICADDWORD, a person could later call the number by saying "Call John Smith", "Call Mother", or "Call my office number".

ACOUSTICADDWORD stores the voicetag into a specified TopicList. In its operation, ACOUSTICADDWORD plays a prompt, receives and records a voicetag, verifies the voicetag, then stores the voicetag. AcousticAddWord has the ability to recover from errors by re-checking the voicetag more than once. AcousticAddWord checks and returns an error to the user in the event of duplication. The parameters for ACOUSTICADDWORD include Initial_Prompt, Timeout, STS_Sound, TopicList, MaxTries, Repeat_Prompt, Intervene$_{13}$ Prompt, Error_Prompt, Ok_Prompt, and Help_Prompt. The Initial$_{13}$ Prompt parameter is the initial prompt to be played to a user, such as "Say the new name" in the example of storing names in a voice controlled telephone's phonebook. The Timeout parameter is the number of milliseconds to wait before flagging a response that a failure was detected. The STS_Sound (Spoke-Too_Soon Sound) parameter is the sound or prompt to be played if user speaks before the Prompt finishes playing. Typically, the STS_Sound will be a short tone or beep sound rather than a spoken phrase. The parameter TopicList is the vocabulary subset for which the SRS 204 should store the new voicetag in. The MaxTries parameter is the maximum number of times AcousticAddWord will re-prompt the user in an effort to get a good recognition. If recognition does not occur after MaxTries, AcousticAddWord will return an error indication. The Repeat$_{13}$ Prompt parameter is the prompt played to ask the user to repeat what was just said (e.g. "Please repeat what you said"). This prompt is used when a spoke-too-soon error occurred. The Intervene$_{13}$ Prompt parameter is a prompt played to ask the user to repeat himself (e.g. "There was too much noise. Please repeat what you said."). This prompt is played when there was too much noise during the previous recognition attempt. Error_Prompt parameter is the prompt played when the repeated name does not match the initial name, or if the name is a duplicate (e.g. "Please try again."). The OK_Prompt parameter is the prompt played when the new name has been successfully recorded and stored (e.g. "<name> is now stored in the address book"). The Help_Prompt parameter is the prompt played when the user seems to need further instructions, including when the user says nothing. The voice controlled device returns a pointer to an integer array upon completion of the user interface function. If the recognition of a response associated with the AcousticAddWord was successful, the array is seven elements long. Element 1 is a value of 1 indicating successful recognition. Element 2 is a value indicating the token number assigned by the SRS 204, which corresponds to the voicetag that was stored. Element 3 is a pointer to a recorded copy of the voicetag. Element 4 is a value indicating the number of timeout errors that occurred. Element 5 is a value indicating the number of times there was a failure to match the name. Element 6 is a value indicating the number of times spoke-too-soon occurred. Element 7 is a value indicating the number of times the help prompt was played. If recognition was not successful, the array is six elements long. The first element is zero. The second element indicates the most recent type of error that occurred. The third through fifth elements indicate the number of times each type of error occurred between when AcousticAddWord was called to when AcousticAddWord returned. The sixth element indicates the number of times the help prompt was played. In this case, Element 1 is a value of indicating that an error was detected. Element 2 has a value of 17 indicating that a response was not detected in the allowed time (TimeOut error); 18 indicating that a response was detected, but it was not recognizable (Noise error); 19 indicating that a spoke-to-soon error was detected; 20 indicating a Recognition failure (no match on repeat); or 21 indicating a Voicetag list already full. Element 3 is a value of x indicating the number of times a TimeOut error was detected. Element 4 is a value of y indicating the number of times a recognition error was detected. Element 5 is a value of z indicating the number of times a spoke-too-soon error was detected. Element 6 is a value indicating the number of times the help prompt was played.

Etiquette for Voice Controlled Devices

The standard VUI includes an etiquette for voice controlled devices. Generally, voice controlled devices (also referred to as machines) should conduct themselves like well-behaved guests.

However, human factors and human issues involved in living with voice controlled devices are largely unexplored. In designing voice controlled devices, the following suggestions should be considered.

Machine Requests to Humans

Machines can ask humans to do things. Any request should be polite. For example, a voice activated cellular telephone might ask to be placed in its charger when its batteries are running low. Humans should always have the option to refuse a machine's request, and the machine should politely accept that, unless the machine considers the situation threatening to human life or valuable data, in which case its protests can be more urgent.

Machines That Use the Telephone On Their Own

If a voice controlled device answers the telephone, or places a call to a human user, it should clearly identify itself as a machine if there is any risk of it being considered human.

Recording User Speech

No machine should record or transcribe a human user's conversations unless those humans present are aware that this is occurring.

Volume Levels

Machines should modulate their volume levels in response to ambient noise levels, unless specifically overridden by a human. Machines should be sensitive to when humans want them to be silent (for example, when humans are sleeping). Machines shouldn't babble needlessly, and should permit a user barge-in as a means to silence them.

Machine-to-Machine Communication

Figure 13:
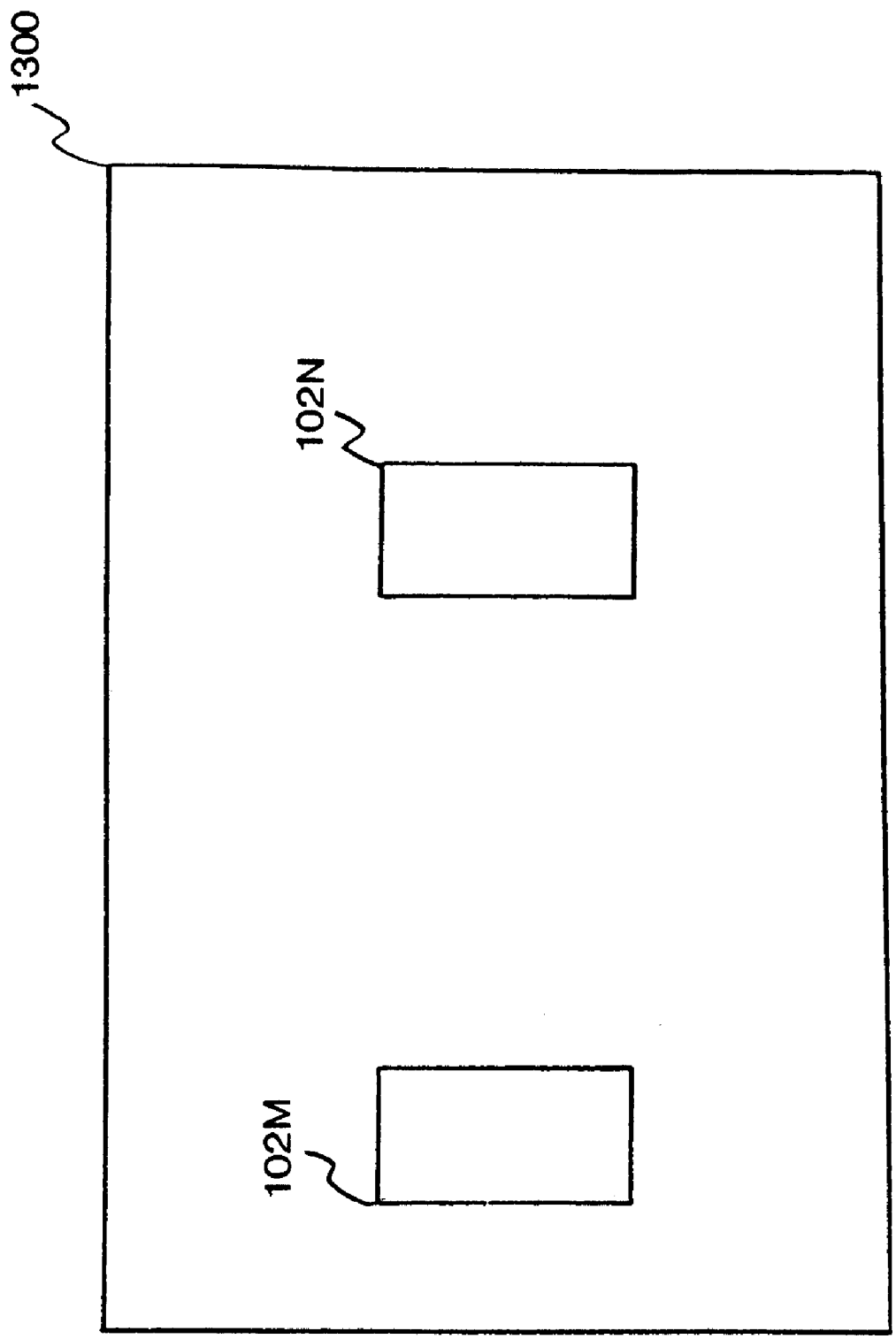
FIG. 13 is a block diagram of a pair of voice controlled devices communicating using the standard voice user interface of the present invention.

FIG. 13 is a block diagram of a pair of voice controlled devices 102M and 102N (each also referred to as a machine) communicating, neither, one or both of which could be using the standard voice user interface 500 of the present invention in the communication environment 1300. Voice controlled devices can talk to each other to find out what other voice controlled devices are present, what kinds of information they understand, and to exchange information. For example, a voice controlled TV may ask a voice controlled VCR about necessary settings for it to operate. Machine-to-machine communication between voice controlled devices occurs in both audible and non-audible formats. Essentially, machine-to-machine communication using speech may occur over any speech-compatible media, including sound waves through air, conventional telephone links, Internet voice links, radio voice channels, and the like. Machine-to-machine communication can occur where none of the machines, some of the machines, or all of the machines include the VUI of the present invention.

Using the standard VUI, a voice controlled device can locate other voice controlled devices within a communications environment in a number of ways. These include overhearing a human interact with another machine, overhearing a machine interact with another machine, explicitly requesting nearby machines to identify themselves by using the identification phrase "<silence> What is out there?", explicitly seeking a specific class of machines (e.g. all clocks) by addressing them by a name category "<silence> Clock are you out there?", or explicitly seeking a specific machine (e.g. a clock named Socrates) by addressing it by name "<silence> Socrates are you out there?".

In the first two cases, the process of listening to other conversations would reveal the other machines names. In the other three cases the machines within earshot who respond to the "are you out there" command would respond with their names. In the last two cases, the "What is out there?" command is restricted to certain classes of machines and a specific named machine thereby limiting the number of machines that will respond to the command. Once the name of the target voice controlled device is known, the initiating voice controlled device can issue other commands (e.g. "Socrates what time is it?") to the other.

In some cases, a voice controlled device may need to talk to another voice controlled device, one or both of which may not adhere to the above protocol. In these cases, the machines can be explicitly programmed to issue the correct commands and recognize appropriate responses. A simple example of this interaction would be a voice controlled device with voice recognition capability and a telephone voice interface dialing a voice-based service such as a spoken report of the time, and simply capturing the desired data (the time).

The preferred embodiments of the present invention for METHOD AND APPARATUS FOR CONTROLLING VOICE CONTROLLED DEVICES are thus described. While the preferred embodiments of the present invention utilize a speaker independent voice recognition system, the present invention is also compatible with speaker dependent voice recognition systems. While the present invention has been described in particular embodiments, the present invention should not be construed as limited by such embodiments, but rather construed according to the claims that follow below.

What is claimed is:

1. A voice controlled device comprising:

a processor;

a processor readable storage medium;

code recorded in the processor readable storage medium to store at least one user assignable appliance name in the processor readable storage medium;

code recorded in the processor readable storage medium to inform a user of said at least one user assignable appliance name after a random delay upon receiving a command from said user for said at least one user assignable appliance name;

code recorded in the processor readable storage medium to recognize the at least one user assignable appliance name;

code recorded in the processor readable storage medium to store personal preferences of the voice controlled device associated with the at least one user assignable appliance name;

code recorded in the processor readable storage medium to personalize the voice controlled device to the stored personal preferences associated with the at least one user assignable appliance name upon recognition of the at least one user assignable appliance name;

code recorded in the processor readable storage medium to recognize a command; and code recorded in the processor readable storage medium to control the voice controlled device in response to recognizing the user assignable appliance name and the command, wherein said appliance name and the command is communicated in electronic from over a wireless medium.

2. The voice controlled device of claim 1, further comprising:

code recorded in the processor readable storage medium to store a default appliance name associated with the voice controlled device;

code recorded in the processor readable storage medium to recognize the default appliance name associated with the voice controlled device; and wherein, code recorded in the processor readable storage medium to control the voice controlled electronic device is further responsive to recognizing the default appliance name and the command.

3. The voice controlled device of claim 2, wherein, the default appliance name associated with the voice controlled device is factory assignable.

4. The voice controlled device of claim 2, wherein, the default appliance name associated with the voice controlled device is factory and user assignable.

5. The voice controlled device of claim 1, wherein, the user assignable appliance name and the command are provided using audible speech.

6. The voice controlled device of claim 1 further comprising:

code recorded in the processor readable storage medium to store a default appliance name associated with the voice controlled device;

code recorded in the processor readable storage medium to recognize the default appliance name associated with the voice controlled device; and wherein, code recorded in the processor readable storage medium to control the voice controlled electronic device is further responsive to recognizing the default appliance name and the command.

7. The voice controlled device of claim 6, wherein, the default appliance name associated with the voice controlled device is factory assignable.

8. The voice controlled device of claim 6, wherein, the default appliance name associated with the voice controlled device is factory and user assignable.

9. A method of controlling a voice controlled device, the method comprising:

providing a voice controlled device having a speech recognition system for recognizing speech;

storing at least one user assignable appliance name into the voice controlled device;

informing a user by said voice controlled device of said at least one user assignable appliance name after a random delay upon receiving a command from said user to said at least one user assignable appliance name;

communicating a communicated appliance name and a command to the voice controlled device;

storing personal preferences into the voice controlled device associated with the at least one user assignable appliance name; and personalizing the voice controlled device to the stored personal preferences associated with the at least one user assignable appliance name if the communicated name is recognized as matching the at least one user assignable appliance name and the command is recognized by the voice controlled device, wherein said appliance name and the command is communicated in electronic form over a wireless medium.

10. The method of claim 9 for activating a voice controlled device, wherein, the communicated appliance name and the command are communicated using audible speech.

11. A method of controlling a voice controlled device, the method comprising:

providing a voice controlled device having a speech recognition system for recognizing speech;

storing a default appliance name into the voice controlled device;

informing a user by said voice controlled device of said at least one user assignable appliance name after a random delay upon receiving a command from said user to said default appliance name;

communicating a communicated name and a command to the voice controlled device;

storing personal preferences into the voice controlled device associated with the default appliance name; and personalizing the voice controlled device to the stored personal preferences associated with the default appliance name if the communicated name is recognized as matching the default appliance name and the command is recognized by the voice controlled device, wherein said appliance name and the command is communicated in electronic form over a wireless medium.

12. The method of claim 11 for activating a voice controlled device, wherein, the communicated appliance name and the command are communicated using audible speech.

13. A method for activating a voice controlled device, the method comprising:

providing a voice controlled device having a speech recognition system for recognizing speech;

storing a default appliance name into the voice controlled device;

storing at least one user assignable appliance name into the voice controlled device;

informing a user by said voice controlled device of said default name and/or said at least one user assignable appliance name after a random delay upon receiving a command from said user for said at least one user assignable appliance name;

communicating a communicated name and a command to the voice controlled device;

controlling the voice controlled device if the communicated name is recognized as matching the at least one user assignable appliance name or the default appliance name and the command is recognized by the voice controlled device;

storing personal preferences into the voice controlled device associated with the at least one user assignable appliance name; and personalizing the voice controlled device to the stored personal preferences associated with the at least one user assignable appliance name if the communicated name is recognized as matching the at least one user-assignable appliance name, wherein said appliance name and the command is communicated in electronic form over a wireless medium.

14. The method of claim 13 for activating a voice controlled device, wherein, the communicated name is communicated using audible speech.

15. The method of claim 13 for activating a voice controlled device, wherein, the default appliance name associated with the voice controlled device is factory assignable.

16. The method of claim 13 for activating a voice controlled device, wherein, the default appliance name associated with the voice controlled device is factory and user assignable.

17. The method of claim 13 for activating a voice controlled device, further comprising:

securing the voice controlled device to protect it from unauthorized use.

18. A first voice controlled device capable of operating in a communication environment with at least one other voice controlled device, the first voice controlled device comprising:

a processor;

a processor readable storage medium;

code recorded in the processor readable storage medium to store a plurality of user assignable appliance names in the processor readable storage medium for activating the first voice controlled device;

code recorded in the processor readable storage medium to inform a user of said plurality of user assignable appliance names after a random delay upon receiving a command from said user for said names;

code recorded in the processor readable storage medium to recognize the plurality of user assignable appliance names associated with the first voice controlled device;

code recorded in the processor readable storage medium to recognize a command; and code recorded in the processor readable storage medium to control the first voice controlled device in response to recognizing one of the plurality of user assignable appliance names and the command, wherein said appliance name and the command is communicated in electronic form over a wireless medium.

19. The first voice controlled device of claim 18 capable of operating in a communication environment with at least one other voice controlled device, wherein, the user assignable appliance names and the command are provided using audible speech.

20. The first voice controlled device of claim 18 capable of operating in a communication environment with at least one other voice controlled device, the first voice controlled device further comprising:

code recorded in the processor readable storage medium to store a default appliance name associated with the voice controlled device;

code recorded in the processor readable storage medium to recognize the default appliance name associated with the voice controlled device; and wherein, code recorded in the processor readable storage medium to control the voice controlled electronic device is further responsive to recognizing the default appliance name and the command.

21. The first voice controlled device of claim 20 capable of operating in a communication environment with at least one other voice controlled device, wherein, the default appliance name associated with each of the voice controlled devices is factory assignable.

22. The first voice controlled device of claim 20 capable of operating in a communication environment with at least one other voice controlled device, wherein the default appliance name associated with each of the voice controlled devices is factory and user assignable.

23. The first voice controlled device of claim 22 capable of operating in a communication environment with at least one other voice controlled device, the first voice controlled device further comprising:

a security means to protect each voice controlled device from unauthorized use.

24. The first voice controlled device of claim 18 capable of operating in a communication environment with at least one other voice controlled device, the first voice controlled device further comprising:

a security means to protect each voice controlled device from unauthorized use.

25. A voice controlled device capable of operating in a communication environment with at least one other voice controlled device, the voice controlled device comprising:

a processor;

a processor readable storage medium;

code recorded in the processor readable storage medium to store a plurality of user assignable appliance names in the processor readable storage medium for activating the voice controlled device;

code recorded in the processor readable storage medium to store personal preferences of the voice controlled device associated with at least one user assignable appliance name;

code recorded in the processor readable storage medium to inform a user of said plurality of user assignable appliance names after a random delay upon receiving a command from said user for said names;

code recorded in the processor readable storage medium to recognize the plurality of user assignable appliance names associated with the voice controlled device;

code recorded in the processor readable storage medium to recognize a command;

code recorded in the processor readable storage medium to personalize the voice controlled device to the stored personal preferences associated with the at least one user assignable appliance name upon recognition of the at least one user assignable appliance name; and code recorded in the processor readable storage medium to control the voice controlled device in response to recognizing one of the plurality of user assignable appliance names and the command, wherein said appliance name and the command is communicated in electronic form over a wireless medium.

26. The voice controlled device of claim 25 capable of operating in a communication environment with at least one other voice controlled device, the voice controlled device further comprising:

a security means to protect each voice controlled device from unauthorized use.

27. The voice controlled device of claim 25 capable of operating in a communication environment with at least one other voice controlled device, the voice controlled device further comprising:

code recorded in the processor readable storage medium to store a default appliance name associated with the voice controlled device;

code recorded in the processor readable storage medium to recognize the default appliance name associated with the voice controlled device; and wherein, code recorded in the processor readable storage medium to control the voice controlled electronic device is further responsive to recognizing the default appliance name and the command.

28. The voice controlled device of claim 27 capable of operating in a communication environment with at least one other voice controlled device, wherein, the default appliance name associated with each of the voice controlled devices is factory assignable.

29. The voice controlled device of claim 27 capable of operating in a communication environment with at least one other voice controlled device, wherein the default appliance name associated with each of the voice controlled devices is factory and user assignable.

30. The voice controlled device of claim 25 capable of operating in a communication environment with at least one other voice controlled device, wherein the at least one user assignable appliance name and the command are recognized from audible speech.

31. A method for a voice controlled device, the method comprising:

storing at least one user assignable appliance name into a voice controlled device;

storing personal preferences into the voice controlled device associated with the at least one user assignable appliance name;

informing a user by said voice controlled device of said at least one user assignable appliance name after a random delay upon receiving a command from said user to said at least one user assignable appliance name;

communicating a communicated appliance name to the voice controlled device; and personalizing the voice controlled device to the stored personal preferences associated with the at least one user assignable appliance name if the communicated appliance name is recognized as matching the at least one user-assignable appliance name, wherein said appliance name and the command is communicated in electronic form over a wireless medium.

32. The method of claim 31 wherein, the communicated appliance name is communicated using audible speech.

33. The method of claim 31 further comprising:

communicating a command to the voice controlled device; and controlling the voice controlled device if the communicated appliance name is recognized as matching the at least one user assignable appliance name and the command is recognized by the voice controlled device.

34. The method of claim 31 further comprising:

storing a default appliance name into the voice controlled device; and controlling the voice controlled device if the communicated appliance name is recognized as matching the at least one user assignable appliance name and the command is recognized by the voice controlled device.

35. The method of claim 34 wherein, the default appliance name associated with the voice controlled device is factory assignable.

36. The method of claim 34 wherein, the default appliance name associated with the voice controlled device is factory and user assignable.

37. The method of claim 31 further comprising:

securing the voice controlled device to protect it from unauthorized use.

* * * * *